US011164080B2

(12) United States Patent
Modha

(10) Patent No.: US 11,164,080 B2
(45) Date of Patent: *Nov. 2, 2021

(54) UNSUPERVISED, SUPERVISED AND REINFORCED LEARNING VIA SPIKING COMPUTATION

(71) Applicant: International Business Machines Corporation, Armonk, NY (US)

(72) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 839 days.

This patent is subject to a terminal disclaimer.

(21) Appl. No.: 15/984,167

(22) Filed: May 18, 2018

(65) Prior Publication Data

US 2018/0268294 A1 Sep. 20, 2018

Related U.S. Application Data

(63) Continuation of application No. 14/945,316, filed on Nov. 18, 2015, which is a continuation of application
(Continued)

(51) Int. Cl.
*G06N 3/06* (2006.01)
*G06N 3/08* (2006.01)
(Continued)

(52) U.S. Cl.
CPC .............. *G06N 3/08* (2013.01); *G06N 3/04* (2013.01); *G06N 3/049* (2013.01); *G06N 3/063* (2013.01); *G06N 3/088* (2013.01)

(58) Field of Classification Search
CPC .......... G06N 3/049; G06N 3/063; G06N 3/04; G06N 3/061; G06N 3/08; G06N 3/088; G11C 11/54; G06K 9/6232; G06K 3/04
See application file for complete search history.

(56) References Cited

U.S. PATENT DOCUMENTS

| 4,893,255 A | 1/1990 | Tomlinson, Jr. |
| 5,331,550 A | 7/1994 | Stafford et al. |
| (Continued) | | |

FOREIGN PATENT DOCUMENTS

| WO | 2008112921 A1 | 9/2008 |
| WO | 2009006735 A1 | 1/2009 |

OTHER PUBLICATIONS

U.S. Final Office Action for U.S. Appl. No. 15/456,429 dated Aug. 10, 2018.
(Continued)

*Primary Examiner* — Li Wu Chang
(74) *Attorney, Agent, or Firm* — Sherman IP LLP; Kenneth L. Sherman; Hemavathy Perumal

(57) ABSTRACT

The present invention relates to unsupervised, supervised and reinforced learning via spiking computation. The neural network comprises a plurality of neural modules. Each neural module comprises multiple digital neurons such that each neuron in a neural module has a corresponding neuron in another neural module. An interconnection network comprising a plurality of edges interconnects the plurality of neural modules. Each edge interconnects a first neural module to a second neural module, and each edge comprises a weighted synaptic connection between every neuron in the first neural module and a corresponding neuron in the second neural module.

12 Claims, 29 Drawing Sheets

Related U.S. Application Data

No. 13/587,424, filed on Aug. 16, 2012, now Pat. No. 9,245,223, which is a continuation of application No. 13/235,342, filed on Sep. 16, 2011, now Pat. No. 8,874,498.

(51) Int. Cl.
  *G06N 3/04* (2006.01)
  *G06N 3/063* (2006.01)

(56) References Cited

U.S. PATENT DOCUMENTS

| | | | |
|---|---|---|---|
| 5,469,530 | A | 11/1995 | Makram-Ebied et al. |
| 5,619,619 | A | 4/1997 | Shinohara |
| 5,646,868 | A | 7/1997 | Ueda et al. |
| 5,721,807 | A | 2/1998 | Tschirk |
| 5,764,860 | A | 6/1998 | Yatsuzuka |
| 5,768,476 | A | 6/1998 | Sugaya et al. |
| 6,134,537 | A | 10/2000 | Pao et al. |
| 6,167,390 | A | 12/2000 | Brady et al. |
| 7,181,768 | B1 | 2/2007 | Ghosh et al. |
| 7,412,428 | B2 | 8/2008 | Nugent |
| 7,430,546 | B1 | 9/2008 | Suri |
| 7,543,266 | B2 | 6/2009 | Brown |
| 7,676,441 | B2 | 3/2010 | Matsugu |
| 7,953,683 | B2 | 5/2011 | Minamino et al. |
| 7,996,342 | B2 | 8/2011 | Grabarnik et al. |
| 8,059,890 | B2 | 11/2011 | Bach |
| 8,103,602 | B2 | 1/2012 | Izhikevich |
| 8,205,183 | B1 | 6/2012 | Goh et al. |
| 8,285,667 | B2 | 10/2012 | Jaros et al. |
| 8,635,171 | B1 * | 1/2014 | Kennedy ............ G06F 21/55 706/12 |
| 8,856,055 | B2 | 10/2014 | Brezzo |
| 2005/0050087 | A1 * | 3/2005 | Milenova ............ G06F 16/285 |
| 2008/0071712 | A1 | 3/2008 | Cecchi et al. |
| 2008/0091628 | A1 | 4/2008 | Srinivasa et al. |
| 2010/0179935 | A1 | 7/2010 | Srinivasa et al. |
| 2012/0126850 | A1 | 5/2012 | Wasson et al. |
| 2012/0126851 | A1 | 5/2012 | Kelem et al. |
| 2012/0131257 | A1 | 5/2012 | Rudosky et al. |
| 2012/0131288 | A1 | 5/2012 | Box et al. |
| 2012/0311595 | A1 | 12/2012 | Saha et al. |
| 2013/0073494 | A1 | 3/2013 | Modha et al. |
| 2014/0019393 | A1 | 1/2014 | Modha et al. |
| 2014/0310220 | A1 | 10/2014 | Chang et al. |
| 2015/0227849 | A1 | 8/2015 | Jaros |
| 2015/0262056 | A1 | 9/2015 | Modha et al. |
| 2015/0363690 | A1 | 12/2015 | Modha et al. |
| 2015/0371131 | A1 | 12/2015 | Modha et al. |
| 2016/0162780 | A1 | 6/2016 | Modha |
| 2017/0017878 | A1 | 1/2017 | Modha |
| 2017/0185896 | A1 | 6/2017 | Modha |
| 2017/0213133 | A1 | 7/2017 | Modha |
| 2017/0308788 | A1 | 10/2017 | Modha |
| 2019/0205754 | A1 | 7/2019 | Modha |
| 2019/0370655 | A1 | 12/2019 | Modha |

OTHER PUBLICATIONS

U.S. Notice of Allowance for U.S. Appl. No. 15/162,361 dated Jun. 5, 2019.
U.S. Notice of Allowance for U.S. Appl. No. 15/456,429 dated Dec. 7, 2018.
Foldiak, P. et al., "Forming sparse representation by local anti-Hebbian learning", Biological Cybernetics, Jul. 25, 1990, pp. 165-170, Spring-Verlag.
U.S. Non-Final Office Action for U.S. Appl. No. 15/162,361 dated Feb. 4, 2019.
Khan, M.M. "Configuring a Massively Parallel CMP System for Real-Time Neural Applications" Doctoral dissertation, 2009, pp. 1-216.
Navaridas, J. et al., "Understanding the Interconnection Network of SpiN Naker", In Proceedings of the 23rd international conference on Supercomputing, Jun. 8, 2009, pp. 286-295.
Jin, X. et al., "Implementing Spike-Timing-Dependent Plasticity on SpiN Naker Neuromorphic Hardware", In The 2010 International Joint Conference on Neural Networks (IJCNN), Jul. 18, 2010, pp. 1-8, IEEE, United States.
Khan, M.M. et al., "SpiNNaker: Mapping neural networks onto a massively-parallel chip multiprocessor", In 2008 IEEE International Joint Conference on Neural Networks (IEEE World Congress on Computational Intelligence, Jun. 1, 2008, pp. 2849-2856, IEEE, United States.
Rast, A.D. et al., "Scalable event-driven native parallel processing: the Spi N Naker neuromimetic system", 2010, In Proceedings of the 7th ACM international conference on Computing frontiers, May 17, 2010, pp. 21-30.
Swinehart, C.D. et al., "Dimensional Reduction for Reward-based Learning", Network: Computation in Neural Systems, Sep. 2006, pp. 235-252, vol. 17, Issue 3, Informa Healthcare, United Kingdom.
Schaal, S. et al., "Computational Approaches to Motor Learning by Imitation," Philosophical Transactions of the Royal Society B: Biological Sciences, Mar. 29, 2003, pp. 537-547, vol. 358, No. 1431, The Royal Society, London, United Kingdom.
Upegui, A. et al., "An FPGA Platform for On-line Topology Exploration of Spiking Neural Networks", Microprocessors and Microsystems, 2005, pp. 211-223, vol. 29, No. 5, Elsevier B.V., The Netherlands.
Seeger, M.W. et al., "Bayesian Inference and Optimal Design for the Sparse Linear Model," Journal of Machine Learning Research (JMLR), Apr. 2008, pp. 759-813, vol. 9, Massachusetts institute of Technology Press and Microtome Publishing, United States.
Huerta, R. et al., "Fast and Robust Learning by Reinforcement Signals: Explorations in the insect Brain," Letter in Neural Computation, Aug. 2009, pp. 2123-2151, vol. 21, No. 8, Massachusetts Institute of Technology Press, United States.
Buonomano, D.V. et al., "State-Dependent Computations: Spatiotemporal Processing in Cortical Networks," Nature Reviews Neuroscience, 2009, pp. 113-125, vol. 10, No. 2, Macmillan Publishers Limited, United States.
Cios, K.J. et al., "Advances in Applications of Spiking Neuron Networks", Proceedings of the SPIE Applications and Science of Computational Intelligence III Conference, 2000, pp. 324-336, vol. 4055, SPIE, United States.
Hahnloser, R., "Learning Algorithms Based on Linearization," Network: Computation in Neural System, Aug. 1998, pp. 363-380, vol. 9, No. 3, Informa Healthcare, United Kingdom.
Pham, H.T. et al., "Controlling Multi-Class Error Rates for MLP Classifier by Bias Adjustment based on Penalty Matrix", Proceedings of the 6th International Conference on Ubiquitous Information Management and Communication (ICUIMC'12), Feb. 20-22, 2012, pp. 1-9, ACM, United States.
Ijspeert, A.J.,"Central pattern generators for locomotion control in animals and robot: A review", Neural Networks 21, Mar. 7, 2008, pp. 642-653, Elsevier, Untied States.
Righetti, L. et al., "Dynamic Hebbian learning in adaptive frequency oscillators", Scienedirect Physica D 216, 2006, pp. 269-281, Elsevier, United States.
Anonyomous, Basic Conceptions for Neural Networks (BCNN), "Basic concepts for neural networks", Neural Network Technology, pp. 1-6, Cheshire Engineering Corporation, downloaded Dec. 22, 2013 from http://www.cheshireeng.com/Neuralyst/nngb.htm.
Bengio, S. et al., "On the Optimization of a Synaptic Learning Rule", Proceedings of the 1992 Conference on Optimality in Artificial and Biological Neural Networks, 1992, pp. 1-29, United States.
Koenderink, J.J., "Simultaneous Order in Nervous Nets from a Functional Standpoint", Biological Cybernetics, 1984, pp. 35-41, Vo. 50, Spring-Verlag, United States.
Petridis, V. et al., "Fuzzy Lattice Neural Network (FLNN): A Hybrid Model for Learning", IEEE Transactions on Neural Networks, Sep. 1998, pp. 877-890, vol. 9, No. 5, United States.

(56) References Cited

OTHER PUBLICATIONS

Bullmore, E. et al., "Complex brain networks: graph theoretical analysis of structural and functional systems", Mar. 2009, Naure Reviews: Neuroscience, pp. 186-198, vol. 10, United States.

Martinetz, T. et al., "Three-Dimensional Neural Net for Learning Visuomotor Coordination of a Robot Arm", IEEE Transactions on Neural Networks, Mar. 1990, pp. 131-136, vol. 1, No. 1, United States.

Schuster, M. et al., "Bidirectional Recurrent Neural Networks", Proceedings of the 1997 IEEE Transactions on Signal Processing, Nov. 1997, pp. 2673-2681, vol. 45, No. 11, IEEE Transactions, United States.

Anonyomous, "4.2 Spike response model (SRM)", 2002, pp. 1-16, Cambridge University Press, United States [downloaded from http://icwww.epfl.ch/~gerstner/SPNM/node27.html on Jul. 31, 2015].

Collobert, R. et al., "A Unified Architecture for Natural Language Processing: Deep Neural Networks with Multitask Learning", Proceedings of the 25th International Conference on Machine Learning, 2008, pp. 1-8, Finland.

Hesse, F. et al., "Modulated Exploratory Dynamics Can Shape Seif-Organized Behavior", Advances in Complex Systems, 2009, pp. 1-18, vol. 12, No. 3, World Scientific Publishing Company, United States.

Tsague, H.D., "Machine Condition Monitoring Using Neural Networks: Feature Selection Using Genetic Algorithm", Dissertation, University of Witwatersrand, Apr. 2006, pp. 1-57, Johannesburg, South Africa.

U.S. Non-Final Office Action for U.S. Appl. No. 13/235,342 dated Dec. 26, 2013.
U.S. Final Office Action for U.S. Appl. No. 13/235,342 dated Apr. 18, 2014.
U.S. Notice of Allowance for U.S. Appl. No. 13/235,342 dated Jun. 23, 2014.
U.S. Non-Final Office Action for U.S. Appl. No. 13/587,424 dated Aug. 10, 2015.
U.S. Notice of Allowance for U.S. Appl. No. 13/587,424 dated Sep. 16, 2015.
U.S. Non-Final Office Action for U.S. Appl. No. 14/494,372 dated Dec. 10, 2015.
U.S. Notice of Allowance for U.S. Appl. No. 14/494,372 dated Mar. 29, 2016.
U.S. Non-Final Office Action for U.S. Appl. No. 14/945,316 dated Jan. 20, 2017.
U.S. Non-Final Office Action for U.S. Appl. No. 13/325,316 dated Dec. 16, 2013.
U.S. Notice of Allowance for U.S. Appl. No. 13/325,316 dated Mar. 28, 2014.
U.S. Non-Final Office Action for U.S. Appl. No. 13/594,045 dated Mar. 24, 2015.
U.S. Notice of Allowance for U.S. Appl. No. 13/594,045 dated Mar. 1, 2017.
U.S. Notice of Allowance for U.S. Appl. No. 13/235,343 dated Jan. 13, 2013.
U.S. Non-Final Office Action for U.S. Appl. No. 13/594,058 dated Aug. 20, 2015.
U.S. Notice of Allowance for U.S. Appl. No. 13/594,058 dated Nov. 12, 2015.
U.S. Non-Final Office Action for U.S. Appl. No. 15/015,990 dated Apr. 12, 2016.
U.S. Notice of Allowance for U.S. Appl. No. 15/015,990 dated Jul. 6, 2016.
U.S. Notice of Allowance for U.S. Appl. No. 13/325,321 dated Aug. 29, 2013.
U.S. Non-Final Office Action for U.S. Appl. No. 13/596,274 dated May 11, 2015.
U.S. Final Office Action for U.S. Appl. No. 13/596,274 dated Sep. 2015.
U.S. Advisory Action for U.S. Appl. No. 13/596,274 dated Dec. 11, 2015.
U.S. Non-Final Office Action for U.S. Appl. No. 13/596,274 dated Feb. 18, 2016.
U.S. Final Office Action for U.S. Appl. No. 13/596,274 dated Jul. 14, 2016.
U.S. Advisory Action for U.S. Appl. No. 13/596,274 dated Oct. 21, 2016.
U.S. Notice of Allowance for U.S. Appl. No. 13/596,274 dated Dec. 16, 2016.
U.S. Final Office Action for U.S. Appl. No. 14/945,316 dated May 18, 2017.
U.S. Advisory Action for U.S. Appl. No. 14/945,316 dated Jul. 19, 2017.
U.S. Non-Office Action for U.S. Appl. No. 14/945,316 dated Nov. 20, 2017.
U.S. Notice of Allowance for U.S. Appl. No. 14/945,316 dated Mar. 12, 2018.
U.S. Non-Final Office Action for U.S. Appl. No. 15/456,429 dated Jun. 16, 2017.
U.S. Final Office Action for U.S. Appl. No. 15/456,429 dated Dec. 4, 2017.
U.S. Advisory Action for U.S. Appl. No. 15/456,429 dated Apr. 18, 2017.
U.S. Non-Final Office Action for U.S. Appl. No. 15/280,047 dated Mar. 18, 2020.
U.S. Notice of Allowance for U.S. Appl. No. 15/280,047 dated Sep. 10, 2020.
U.S. Corrected Notice of Allowability for U.S. Appl. No. 15/280,047 dated Nov. 4, 2020.

Gutierrez, A. et al., "Evolution of Neuro-Controllers for Robots' Alignment using Local Communication", International Journal of Advanced Robotic Systems, vol. 6, No. 1, 2009, pp. 25-34, Sage Journals.

Mirowski, "Time Series Modeling with Hidden Variables and Gardient-Based Algorithms", Department of Computer Science, Courant Institute of Mathematical Sciences, New York University, Ph. D. Dissertation, Jan. 1, 2011, pp. 1-213.

U.S. Notice of Allowance for U.S. Appl. No. 16/289,488 dated Apr. 7, 2021.

* cited by examiner

Input Screen

Input Screen

Input Screen

Input Screen

Input Screen

Approximate Input Screen

| Pre \ Post | $U_1^\uparrow$ 0 | $U_2^\uparrow$ 1 | $L_1^\downarrow$ 2 | $L_2^\downarrow$ 3 | $L_1^\uparrow$ 4 | $L_2^\uparrow$ 5 |
|---|---|---|---|---|---|---|
| $U_1^\uparrow$ 0 | | | | | | |
| $U_2^\uparrow$ 1 | W | | | | | |
| $L_1^\downarrow$ 2 | | | | $W^T$ | | |
| $L_2^\downarrow$ 3 | | I* | | | | |
| $L_1^\uparrow$ 4 | | | I* | | | |
| $L_2^\uparrow$ 5 | | | | | W | |

Input Screen

Output Screen

Approximate Input Screen

Approximate Output Screen

Input Screen

Output Screen

Approximate Input Screen

Approximate Output Screen

UNSUPERVISED, SUPERVISED AND REINFORCED LEARNING VIA SPIKING COMPUTATION

GOVERNMENT RIGHTS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, unsupervised, supervised and reinforced learning via spiking computation.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

The present invention relates to unsupervised, supervised and reinforced learning via spiking computation. In one embodiment, the present invention provides a neural network comprising a plurality of neural modules, wherein each neural module comprises multiple digital neurons such that each neuron in a neural module has a corresponding neuron in another neural module. An interconnection network comprising a plurality of edges interconnects the plurality of neural modules, wherein each edge interconnects a first neural module to a second neural module, and each edge comprises a weighted synaptic connection between every neuron in the first neural module and a corresponding neuron in the second neural module.

In another embodiment, the present invention provides a method comprising producing spiking computation in a neural network comprising a plurality of neural modules interconnected via weighted synaptic connections in an interconnection network, wherein each neural module comprises multiple digital neurons such that every neuron in a first neural module is connected to a corresponding neuron in a second neural module via a weighted synaptic connection. The spiking computation comprises generating signals which define a set of time steps for operation of the neuron. At each time step, each neuron based on its operational state determines whether to generate a firing event in response to firing events received as input signals from neurons in other neural modules. Each said input signal is weighted by the weighted synaptic connection communicating said input signal to said neuron.

These and other features, aspects and advantages of the present invention will become understood with reference to the following description, appended claims and accompanying figures.

BRIEF DESCRIPTION OF THE SEVERAL VIEWS OF THE DRAWINGS

FIG. 5 shows a matrix representing the weighted synaptic connections of a neural network trained for unsupervised learning by implementing an embodiment of spiking computation in accordance with the present invention;

DETAILED DESCRIPTION

Figure 1:
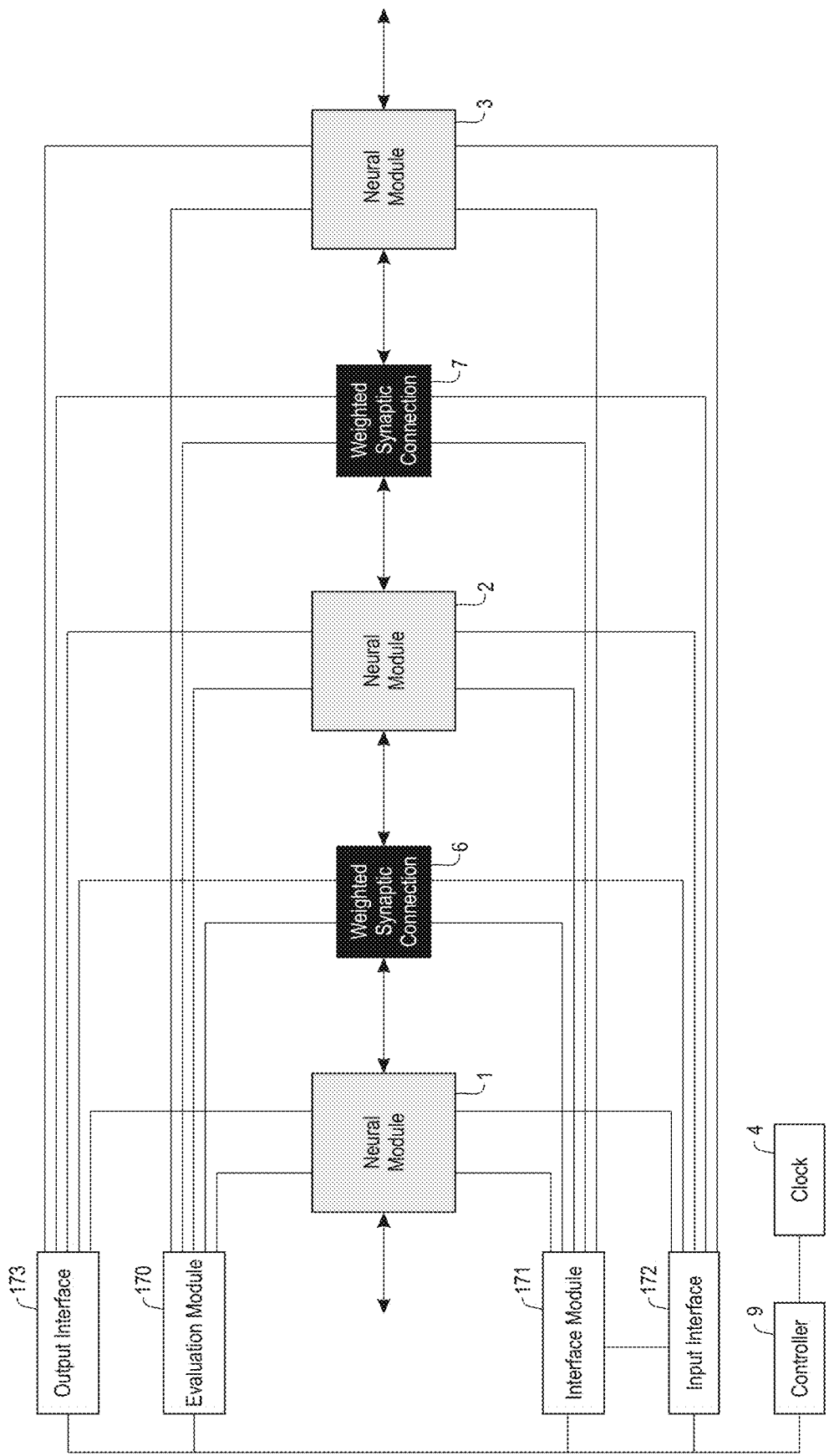
FIG. 1 illustrates a neural network implementing an embodiment of spiking computation in accordance with the present invention.

The present invention relates to unsupervised, supervised and reinforced learning via spiking computation. In one embodiment, the present invention provides a neural network comprising a plurality of neural modules, wherein each neural module comprises multiple digital neurons such that each neuron in a neural module has a corresponding neuron in another neural module. An interconnection network comprising a plurality of edges interconnects the plurality of neural modules, wherein each edge interconnects a first neural module to a second neural module, and each edge comprises a weighted synaptic connection between every neuron in the first neural module and a corresponding neuron in the second neural module.

In another embodiment, the present invention provides a method comprising producing spiking computation in a neural network comprising a plurality of neural modules interconnected via weighted synaptic connections in an interconnection network, wherein each neural module comprises multiple digital neurons such that every neuron in a first neural module is connected to a corresponding neuron in a second neural module via a weighted synaptic connection. The spiking computation comprises generating signals which define a set of time steps for operation of the neuron. At each time step, each neuron based on its operational state determines whether to generate a firing event in response to firing events received as input signals from neurons in other neural modules. Each said input signal is weighted by the weighted synaptic connection communicating said input signal to said neuron.

The weights of all weighted synaptic connections in the interconnection network are adaptive as a function of the firing events of the interconnected neurons. Each neuron has an operational state, and based on its operational state, each neuron determines whether to generate a firing event in response to firing events received as input signals by the neuron via weighted synaptic connections from neurons in other neural modules. Each received input signal is weighted by the weighted synaptic connection communicating the input signal to the neuron.

An interface module updates learning rules associated with each weighted synaptic connection in the interconnection network. A learning rule for learning false negatives or unlearning false positives is applied to a weighted synaptic connection in the interconnection network when a neuron interconnected via the weighted synaptic connection generates a firing event. The interface module updates the learning rules such that the neural network operates as one of more of: an auto-associative system, a hetero-associative system, and a reinforcement learning system.

Embodiments of the invention provide an adaptive neural network that can interface in real-time with spatiotemporal sensorium and motorium to carry out tasks of perception including unsupervised learning, action including supervised learning, and cognition including reinforcement learning, in a noise-robust, self-tuning, and self-configuring fashion. The present invention provides such a neural network by exploiting the symmetry between feedforward and feedback processing pathways and between learning and unlearning so as to progressively transform false positives into false negatives. Embodiments of the invention further provide a neural network that provides locality and massive parallelism to enable a low-power, compact hardware implementation.

The term digital neuron as used herein represents an architecture configured to simulate a biological neuron. A digital neuron creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

An external two-way communication environment may supply sensory inputs and consume motor outputs. Digital neurons implemented using complementary metal-oxide-semiconductor (CMOS) logic gates receive spike inputs and integrate them. The neurons include comparator circuits that generate spikes when the integrated input exceeds a threshold. In one embodiment, weighted synaptic connections are implemented using transposable 1-bit static random-access memory (SRAM) cells, wherein each neuron can be an excitatory or inhibitory neuron. Each learning rule on each neuron axon and dendrite are reconfigurable.

A neural network can be represented as a directed graph, with neurons represented by vertices, and weighted synaptic connections between neurons represented by directed edges, each edge associated with a synaptic weight.

FIG. 1 illustrates a neural network 5 implementing an embodiment of spiking computation according to the present invention, as described herein. The example neural network 5 comprises multiple neural modules, such as neural modules 1, 2, and 3. Each neural module comprises multiple neurons (see, for example, neural module 200 in FIG. 2A comprising neurons $l_i^\uparrow$, $l_i^\downarrow$, $u_i^\uparrow$, and $u_i^\downarrow$).

The neural network 5 further comprises multiple edges, edges 6 and 7 represented as junctions in FIG. 1. The edge 6 comprises a weighted synaptic connection between every neuron in the neural module 1 and a corresponding neuron in the neural module 2. The edge 7 comprises a weighted synaptic connection between every neuron in the neural module 2 and a corresponding neuron in the neural module 3.

Also shown in FIG. 1, the neural network 5 further comprises a control module ("controller") 9 that is connected to a clock 4. The clock 4 produces clock signals used by the controller 9 to generate time-steps. The controller 9 divides each time-step into operational phases in the neural network for neuron updates, etc. In one embodiment, operation of the neural network 5 is driven by time-steps (e.g., based on biological time-steps), wherein within a time-step multiple neuron updates and synaptic connection updates are sequentially handled in a read phase and a write phase, respectively, utilizing the clock 4. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

Also shown in FIG. 1, an input interface 172 provides input to some neurons in the neural modules. An output interface 173 receives output from some neurons in the neural modules. An evaluation module 170 evaluates the output of some neurons in the neural module. An interface module 171 updates the learning rules of the synapses in the neural network circuit. The neural network 5 can comprise more than one output interface, one input interface, one evaluation module and/or one interface module.

Figure 2A:
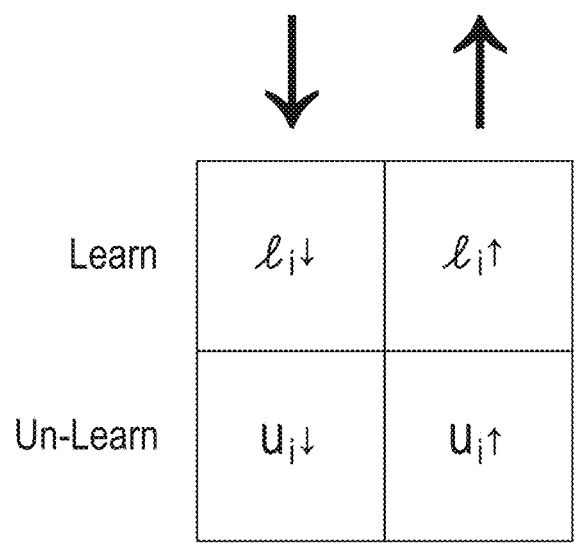
FIG. 2A illustrates the structure of a neural module, in accordance with an embodiment of the invention.

FIG. 2A illustrates the structure of a neural module 200 (an example of neural module 1 in FIG. 1), in accordance with an embodiment of the invention. Each neural module comprises multiple neurons. For instance, the neural module 200 comprises four neurons, neurons $l_i^\uparrow$, $l_i^\downarrow$, $u_i^\uparrow$, and $u_i^\downarrow$. There are four types of neurons: a neuron in a learning, bottom-up pathway; a neuron in a learning, top-down pathway; a neuron in an unlearning, bottom-up pathway; and, a neuron in an unlearning, top-down pathway.

Figure 10:
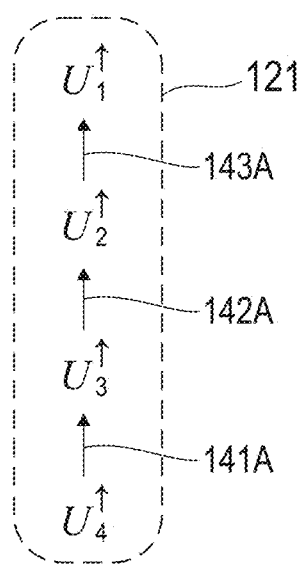
FIG. 10 illustrates a directed graph representing a feedforward unlearning structure implementing an embodiment of spiking computation in accordance with the present invention.
Figure 11:
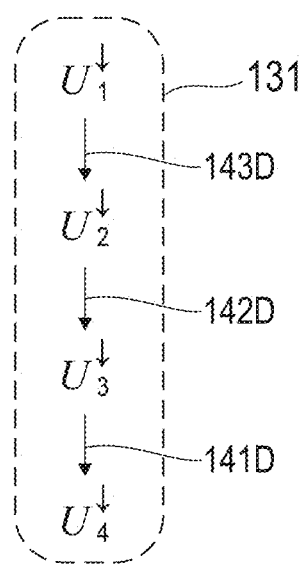
FIG. 11 illustrates a directed graph representing a feedback unlearning structure implementing an embodiment of spiking computation in accordance with the present invention.

In FIG. 2A, the neuron $l_i^\uparrow$ is a neuron in a learning, bottom-up pathway (e.g. learning, bottom-up pathway 101 in FIG. 8), the neuron $l_i^\downarrow$ is a neuron in a learning, top-down pathway (e.g. learning, top-down pathway 111 in FIG. 9), the neuron $u_i^\uparrow$ is a neuron in an unlearning, bottom-up pathway (e.g. unlearning, bottom-up pathway 121 in FIG. 10), and the neuron $u_i^\downarrow$ is a neuron in an unlearning, top-down pathway (e.g. unlearning, top-down pathway 131 in FIG. 11).

Figure 2B:
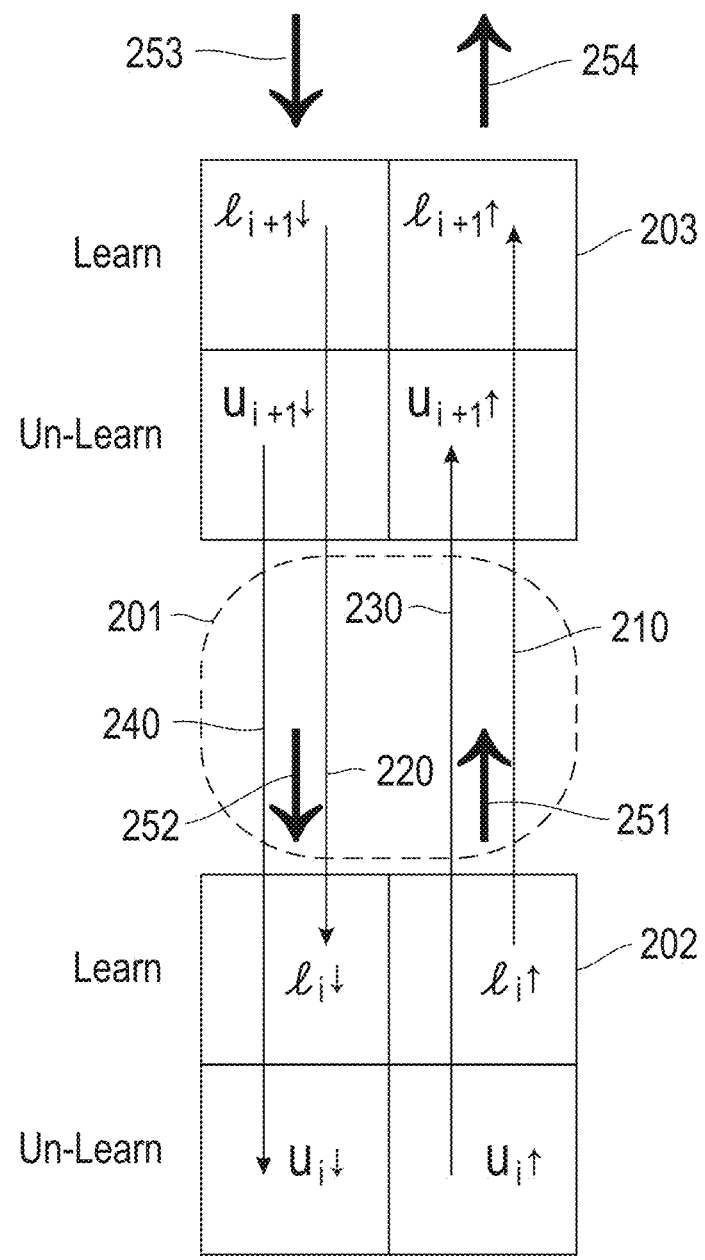
FIG. 2B illustrates the weighted synaptic connections interconnecting one neural module to another neural module, in accordance with an embodiment of the invention.

FIG. 2B illustrates a neural module 202 (an example of neural module 1 in FIG. 1) interconnected to a neural module 203 (an example of neural module 2 in FIG. 1), according to an embodiment of the invention. Each neural module 202, 203 comprises exactly four neurons. The neural module 202 comprises neurons $l_i^\uparrow$, $l_i^\downarrow$, $u_i^\uparrow$, and $u_i^\downarrow$, the neural module 203 comprises neurons $l_{i+1}^\uparrow$, $l_{i+1}^\downarrow$, $u_{i+1}^\uparrow$, and $u_{i+1}^\downarrow$. Each neuron $l_i^\uparrow$, $l_i^\downarrow$, $u_i^\uparrow$, and $u_i^\downarrow$ in the neural module 202 has a one-to-one relationship with neuron $l_{i+1}^\uparrow$, $l_{i+1}^\downarrow$, $u_{i+1}^\uparrow$, and $u_{i+1}^\downarrow$ in the neural module 203, respectively.

As shown in FIG. 2B, an edge 201 (an example of edge 6 in FIG. 1) comprises weighted synaptic connections interconnecting neurons in the neural module 202 to corresponding neurons in the neural module 203. A weighted synaptic connection 210 interconnects the neuron $l_i^\uparrow$ to the neuron $l_{i+i}^\uparrow$, a weighted synaptic connection 220 interconnects the neuron $l_{i+1}^\downarrow$ to the neuron $l_i^\downarrow$, a weighted synaptic connection 230 interconnects the neuron $u_i^\uparrow$ to the neuron $u_{i+1}^\uparrow$, and a weighted synaptic connection 240 interconnects the neuron $u_{i+1}^\downarrow$ to the neuron $u_i^\downarrow$. All weighted synaptic connections between the neural modules 202 and 203 have the same synaptic weight.

Each weighted synaptic connection is directed for information flow through the weighted synaptic connection. The edge 201 in FIG. 2B operates in four contexts. In the first context, the neurons $l_i^\uparrow$ and $l_{i+1}^\uparrow$ are neurons in a learning, bottom-up pathway (e.g. learning, bottom-up pathway 101 in FIG. 8) and information flows from the neuron $l_i^\uparrow$ to the neuron $l_{i+1}^\uparrow$ through the weighted synaptic connection 210. In the second context, the neurons $l_i^\downarrow$ and $l_{i+1}^\downarrow$ are neurons in a learning, top-down pathway (e.g. learning, top-down pathway 111 in FIG. 9) and information flows from the neuron $l_{i+1}^\downarrow$ to the neuron $l_i^\downarrow$ through the weighted synaptic connection 220.

In the third context, the neurons $u_i^\uparrow$ and $u_{i+1}^\uparrow$ are neurons in an unlearning, bottom-up pathway (e.g. unlearning, bottom-up pathway 121 in FIG. 10) and information flows from the neuron $u_i^\uparrow$ to the neuron $u_{i+1}^\uparrow$ through the weighted synaptic connection 230. In the fourth context, the neurons $u_i^\downarrow$ and $u_{i+1}^\downarrow$ are neurons in an unlearning, top-down pathway (e.g. unlearning, top-down pathway 131 in FIG. 11) and information flows from the neuron $u_{i+1}^\downarrow$ to the neuron $u_{i+1}^\downarrow$ through the weighted synaptic connection 240.

With respect to the edge 201, the neurons $l_i^\uparrow$, $l_{i+1}^\downarrow$, $u_i^\uparrow$, and $u_{i+1}^\downarrow$ are pre-synaptic neurons and the neurons $l_{i+1}^\uparrow$, $l_i^\downarrow$, $u_{i+1}^\uparrow$, and $u_i^\downarrow$ are post-synaptic neurons. Arrow 251 represents information flowing from the neurons $l_i^\uparrow$ and $u_i^\downarrow$ in the neural module 202 to the corresponding neurons $l_{i+1}^\uparrow$ and $u_{i+1}^\uparrow$ in the neural module 203, respectively. Arrow 252 represents information flowing from the neurons $l_{i+1}^\downarrow$ and $u_{i+1}^\downarrow$ in the neural module 203 to the corresponding neurons $l_i^\downarrow$ and $u_i^\downarrow$ in the neural module 202, respectively. Arrow 253 represents information flowing to the neurons $l_{i+1}^\downarrow$ and $u_{i+1}^\downarrow$ in the neural module 203 from corresponding neurons in another neural module (not shown). Arrow 254 represents information flowing from the neurons $u_{i+1}^\uparrow$ and $l_{i+1}^\uparrow$ in the neural module 203 to corresponding neurons in another neural module (not shown).

Unsupervised Learning

A neural network, in accordance with an embodiment of the invention, may be trained for unsupervised learning (auto-associative memory). The neural network learns a provided input and produces an approximation of said input. For example, when a neural network including visual sensors is provided a crescent moon shape as an input, the neural network learns the crescent moon shape by application of learning rules to the synapses based on spiking neurons, and reproduces the crescent moon shape as an approximation of the input (approximate input).

Figure 3A:
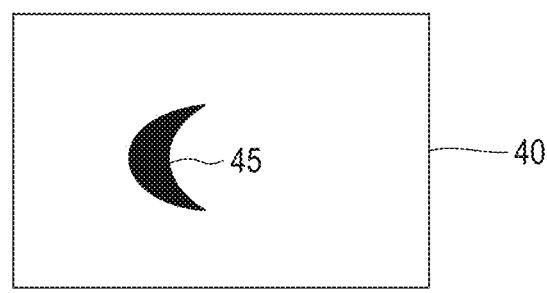
FIG. 3A illustrates an example input provided to a neuron in a neural network, in accordance with an embodiment of the invention.

FIG. 3A illustrates an example input provided to a neural network, in accordance with an embodiment of the invention. As shown in input screen 40, a crescent moon 45 is provided as input to some neurons in a neural network (see, for example, neurons in neuron population $L_2^\uparrow$ in FIG. 4).

Figure 3B:
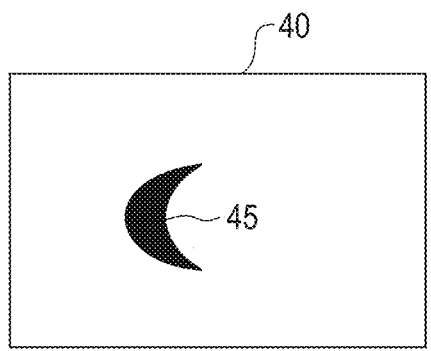
FIG. 3B illustrates a receptive field of a neuron in a neural network, in accordance with an embodiment of the invention.
Figure 3B:
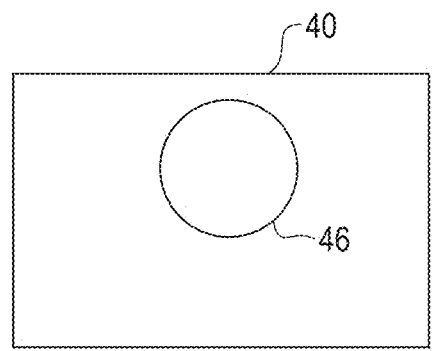

FIG. 3B illustrates a receptive field of a neuron in a neural network, in accordance with an embodiment of the invention. A circle 46 represents the region of the input screen 40 that a neuron receiving the crescent moon 45 as input is receptive to (receptive field). The input processed by the neural network will be a union of multiple such receptive fields.

Figure 3C:
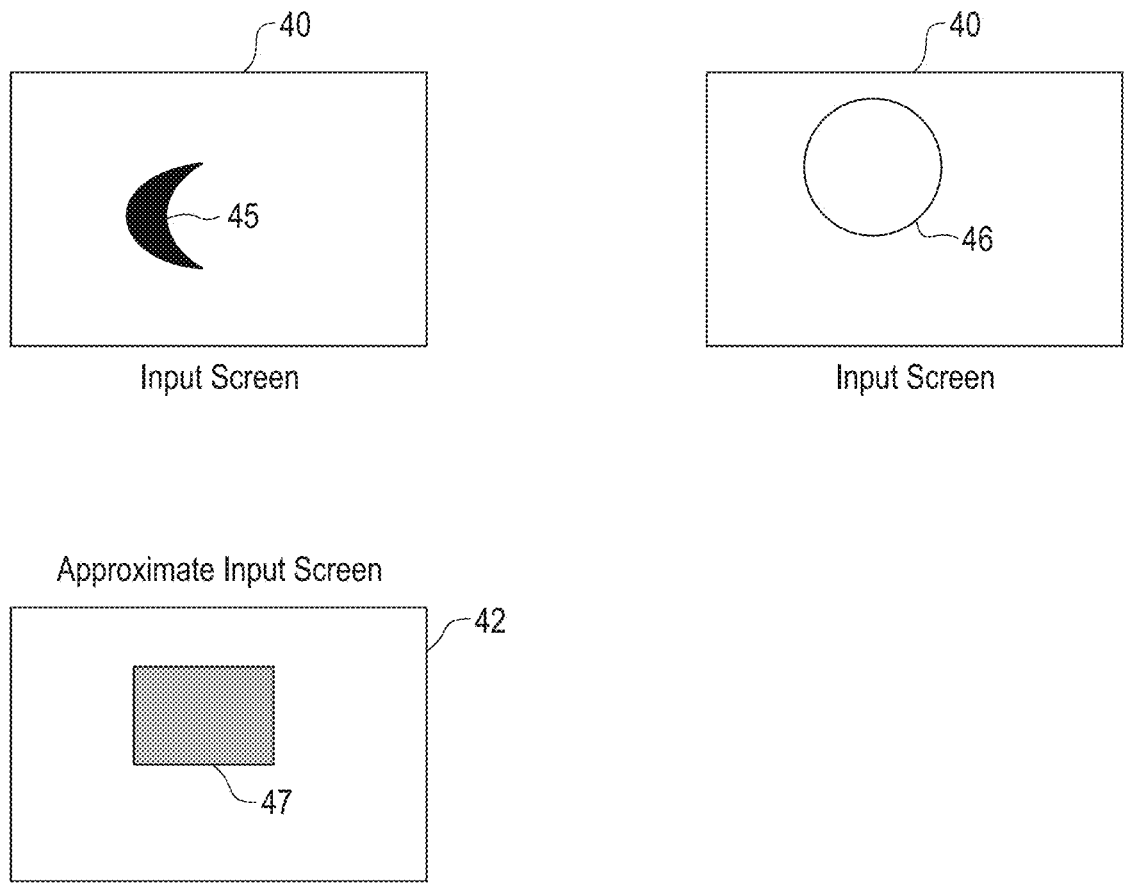
FIG. 3C illustrates a projective field of a neuron in a neural network, in accordance with an embodiment of the invention.

FIG. 3C illustrates a projective field of a neuron in a neural network, in accordance with an embodiment of the invention. A rectangle 47 represents the region in an approximate input screen 42 that a neuron in a neural network (see, for example, neurons in neuron population $L_1^\uparrow$ in FIG. 4) projects to (projective field). The approximate input produced by the neural network will be a union of multiple such projective fields.

Figure 3D:
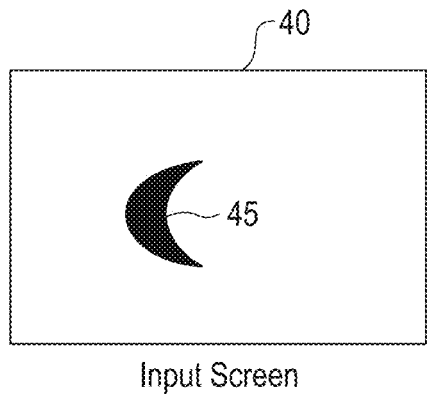
FIG. 3D illustrates an example input provided to a neural network intersecting with a receptive field and a projective field of a neuron in the neural network, in accordance with an embodiment of the invention.
Figure 3D:
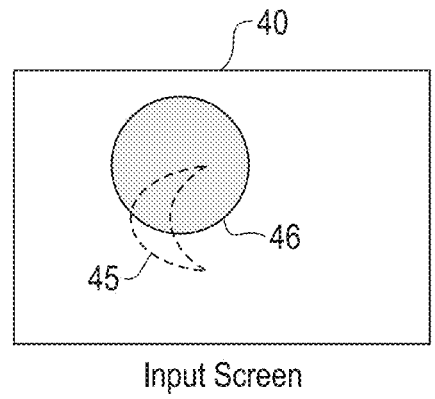
Figure 3D:
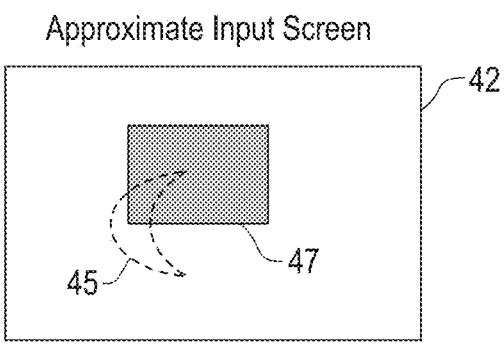

FIG. 3D illustrates an example input provided to a neural network intersecting with a receptive field and a projective field of a neuron in the neural network, in accordance with an embodiment of the invention. The neurons receiving the crescent moon 45 as input are listening to the region of the input screen 40 represented by the circle 46 when it should only be listening to the region represented by the crescent moon 45. Similarly, the neural network is producing the rectangle 47 as its approximate input when it should be producing the crescent moon 45.

Figure 3E:
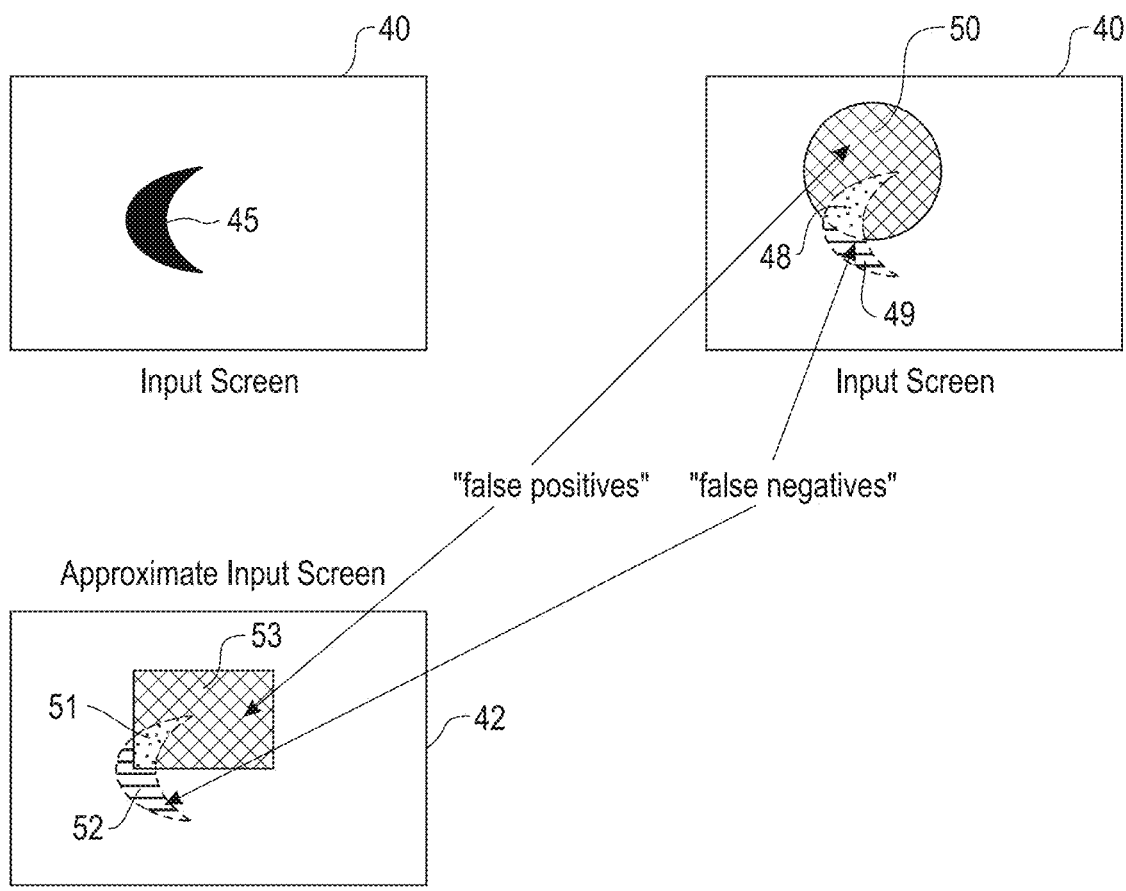
FIG. 3E illustrates an example input provided to a neural network intersecting with a receptive field and a projective field of a neuron in the neural network, in accordance with an embodiment of the invention.

FIG. 3E illustrates an example input provided to a neural network intersecting with a receptive field and a projective field of a neuron in the neural network, in accordance with an embodiment of the invention. In the input screen 40, a region 48 where the crescent moon 45 and the circle 46 intersect represents an area of the crescent moon 45 that the neural network has learned. A region 49 where the crescent moon 45 does not intersect with the circle 46 (FIG. 3D) represents a region of the input screen 40 that the neural network should be listening to but is not. The region 49 represents a false negative that the neural network should be trained to learn. A region 50 where the circle 46 does not intersect with the crescent moon 45 represents a region of the input screen 40 that the neural network should be ignoring but is listening to instead. The region 50 represents a false positive that the neural network should be trained to unlearn.

Also shown in FIG. 3E, in the approximate input screen 42, a region 51 where the crescent moon 45 and the rectangle 47 (FIG. 3D) intersect represents an area of the crescent moon 45 that the neural network has produced. A region 52 where the crescent moon 45 does not intersect with the rectangle 47 represents a region of the approximate input screen 42 that the neural network should project but is not. The region 52 represents a false negative that the neural network should be trained to learn. An region 53 where the rectangle 47 does not intersect with the crescent moon 45 represents a region of the approximate input screen 42 that the neural network should be ignoring but is projecting instead. The region 53 is a false positive that the neural network should be trained to unlearn.

In one example implementation, to accomplish unsupervised learning in a neural network, the neural network may be trained to unlearn the false positives (see, for example, regions 50, 53 in FIG. 3E), learn the false negatives (see, for example, regions 49, 52 in FIG. 3E), and maintain what is correct (see, for example, regions 48, 51 in FIG. 3E). Using the neural network in FIG. 1, the present invention provides a neural network capable of self-tuning to achieve unsupervised learning by learning the false negatives, unlearning the false positives, and maintaining what is correct.

Figure 4:
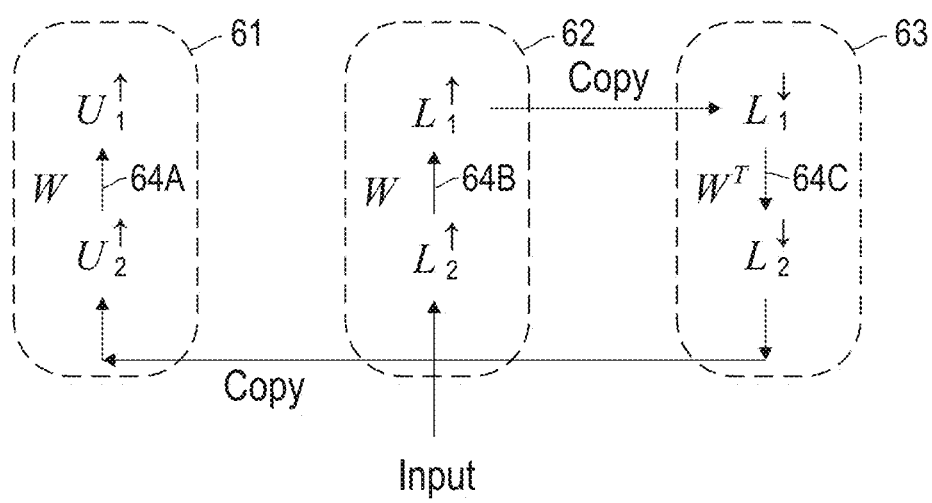
FIG. 4 illustrates a directed graph representing a neural network trained for unsupervised learning by implementing an embodiment of spiking computation in accordance with the present invention.

FIG. 4 illustrates a directed graph representing a neural network 60 trained for unsupervised learning by implementing an embodiment of spiking computation in accordance with the present invention. The neural network 60 comprises edges 64A, 64B, and 64C, pathways 61, 62, and 63, and neuron populations, $U_1^\uparrow$, $U_2^\uparrow$, $L_1^\uparrow$, $L_2^\uparrow$, $L_1^\downarrow$, and $L_2^\downarrow$. Each neuron population $U_1^\uparrow$, $U_2^\uparrow$, $L_1^\uparrow$, $L_2^\uparrow$, $L_1^\downarrow$, and $L_2^\downarrow$ comprises a set of neurons.

The pathway 61 is an unlearning, bottom-up pathway comprising the neuron populations $U_1^\uparrow$ and $U_2^\uparrow$. The pathway 61 is used in the neural network 60 to unlearn false positives (e.g. network-created information). Let $U_i^\uparrow = \{u_{i,1}^\uparrow, u_{i,2}^\uparrow, \ldots, u_{i,Ni}^\uparrow\}$, i=1, 2, denote the set of all neurons within a neuron population in the unlearning, bottom-up pathway 61. The edge 64A comprises a weighted synaptic connection between every neuron in the neuron population $U_1^\uparrow$ and a corresponding neuron in the neuron population $U_2^\uparrow$.

The pathway 62 is a learning, bottom-up pathway comprising the neuron populations $L_1^\uparrow$ and $L_2^\uparrow$. The pathway 62 is used in the neural network 60 to learn false negatives (e.g. input). Let $L_i^\uparrow = \{l_{i,1}^\uparrow, l_{i,2}^\uparrow, \ldots, l_{i,Ni}^\uparrow\}$, i=1, 2, denote the set of all neurons within a neuron population in the learning, bottom-up pathway 62. The edge 64B comprises a weighted synaptic connection between every neuron in the neuron population $L_1^\uparrow$ and a corresponding neuron in the neuron population $L_2^\uparrow$. Input is provided to the neurons in the $L_2^\uparrow$ population. Noise is present in the input to sculpt the receptive fields of the neurons in the neuron population $L_1^\uparrow$.

The pathway 63 is a learning, top-down pathway comprising the neuron populations $L_1^\downarrow$ and $L_2^\downarrow$. The pathway 63 is used in the neural network 60 to learn false negatives (e.g.

input). Let $L_i^{\downarrow} = \{l_{i,1}^{\downarrow}, l_{i,2}^{\downarrow}, \ldots, l_{i,Ni}^{\downarrow}\}$, $i=1, 2$, denote the set of all neurons within a neuron population in the learning, top-down pathway 63. The edge 64C comprises a weighted synaptic connection between every neuron in the neuron population $L_1^{\downarrow}$ and a corresponding neuron in the neuron population $L_2^{\downarrow}$.

The synaptic weight of a weighted synaptic connection between a neuron $l_{2,\alpha}^{\uparrow}$ and a neuron $l_{1,\beta}^{\uparrow}$ T is a weight $w_{\alpha,\beta}$. The synaptic weight of a weighted synaptic connection between a neuron $l_{1,\beta}^{\downarrow}$ and a neuron $l_{2,\alpha}^{\downarrow}$ is the weight $w_{\alpha,\beta}$. The synaptic weight of a weighted synaptic connection between a neuron $u_{2,\alpha}^{\downarrow}$ and a neuron $u_{1,\beta}^{\uparrow}$ is the weight $w_{\alpha,\beta}$. The same weight $w_{\alpha,\beta}$ is used in three different contexts. In FIG. 4, the synaptic weight of every weighted synaptic connection in the edge 64A is represented by a matrix W. The matrix W is also used to represent the synaptic weight of every weighted synaptic connection in the edge 64B. The synaptic weight of every weighted synaptic connection in the edge 64C is represented by the transpose of the matrix W, $W^T$. Thus, the matrix W is used in three different contexts.

In one time step, each neuron in every neuron module updates its operational state and, based on its operational state, each said neuron determines whether to generate a firing event in response to firing events received as input signals by said neuron via weighted synaptic connections from neurons in other neural modules. Each said input signal is weighted by the weight of the weighted synaptic connection communicating said input signal to said neuron. The synaptic weight associated with each weighted synaptic connection is adapted as a function of the firing events of the interconnected neurons.

For instance, in the neural network 60, each time step is divided into three different phases. The operational state of each neuron in the neuron populations $L_2^{\uparrow}$ and $L_1^{\uparrow}$ is updated in one phase of a time step. The operational state of each neuron in the neuron populations $L_2^{\downarrow}$ and $L_1^{\downarrow}$ is updated in another phase of the same time step. The operational state of each neuron in the neuron populations $U_2^{\uparrow}$ and $U_1^{\uparrow}$ is updated in yet another phase of the same time step.

The neural network 60 propagates information in a loop. The firing events generated by the neurons in the $L_1^{\uparrow}$ population are copied and provided as input to the neurons in the $L_1^{\downarrow}$ population. The firing events generated by the neurons in the $L_2^{\downarrow}$ population are also copied and provided as input to the neurons in the $U_2^{\uparrow}$ population.

FIG. 5 shows a matrix 70 that represents the weighted synaptic connections of the neural network 60 in FIG. 4, in accordance with an embodiment of the invention. Each row and each column of the matrix 70 represents the pre-synaptic and post-synaptic populations of the neural network 60, respectively. Row 1, column 0 of the matrix 70 indicates that the synaptic weights of the weighted synaptic connections between the neuron populations $U_2^{\uparrow}$ and $U_1^{\uparrow}$ is represented by the matrix W. Likewise, row 5, column 4 of the matrix 70 indicates that the synaptic weights of the weighted synaptic connections between the neuron populations $L_2^{\uparrow}$ and $L_1^{\uparrow}$ is also represented by the matrix W. Row 2, column 3 of the matrix 70 indicates that the synaptic weights of the weighted synaptic connections between the neuron populations $L_1^{\downarrow}$ and $L_2^{\downarrow}$ is represented by the transpose of matrix W, $W^T$. The I* in row 3, column 1 of the matrix 70 represents the copying of the firing events produced by the neurons in the neuron population $L_2^{\downarrow}$ to provide as input to the $U_2^{\uparrow}$ population. Similarly, the I* in row 4, column 2 of the matrix 70 represents the copying of the firing events produced by the neurons in the neuron population $L_1^{\uparrow}$ to provide as input to the $L_1^{\downarrow}$ population.

Figure 6:
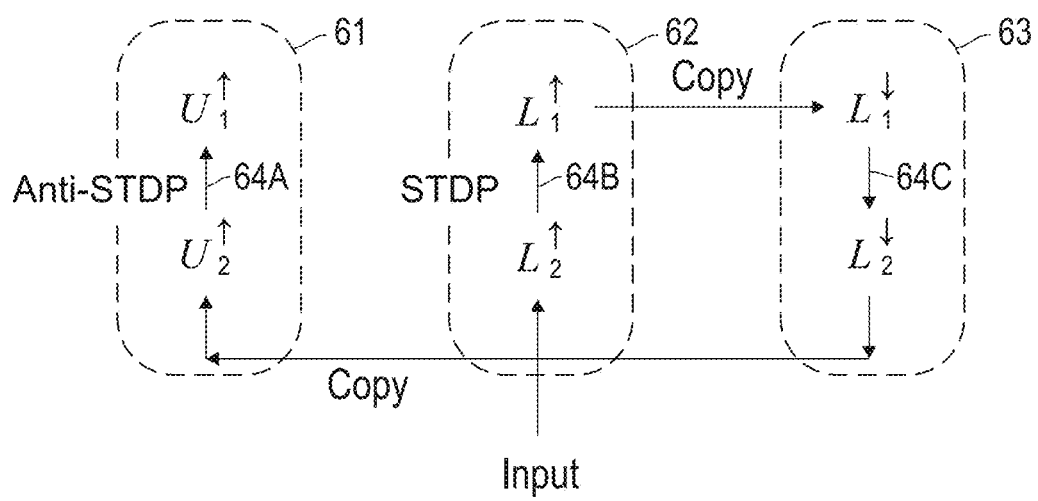
FIG. 6 illustrates a directed graph representing a neural network trained for unsupervised learning by implementing an embodiment of spiking computation in accordance with the present invention.

FIG. 6 illustrates a directed graph representing the neural network 60 in FIG. 5, in accordance with an embodiment of the invention. Learning rules are applied to the weighted synaptic connections in the same time step that each neuron in each neural module updates its operational states. The learning rules are applied based on the firing activity of interconnected neurons in a previous time step.

As shown in FIG. 6, heavy learning occurs by applying a STDP learning rule to the weighted synaptic connections in the edge 64B. The firing events of the neurons in the neuron population $L_2^{\uparrow}$ is amplified as it propagates to the neurons in the neuron population $L_1^{\uparrow}$ via the weighted synaptic connections in the edge 64B. In this manner, the input provided to the neurons in the neuron population $L_2^{\uparrow}$ is learned by the neural network 60.

The firing events produced by the neurons in the neuron population $L_2^{\downarrow}$, however, are network-created, and this network-created information may be unlearned by the neural network 60. As such, the firing events produced by the $L_2^{\downarrow}$ population are copied and provided as input to the neurons in the neuron population $U_2^{\uparrow}$. An anti-STDP learning rule is applied to the weighted synaptic connections in the edge 64A to unlearn the network-created information. The learning rules STDP and anti-STDP are augmented by Hebbian (Hebb) and anti-Hebbian (anti-Hebb), respectively.

After training, the neural network 60 can reproduce the input provided to it as an approximate input. For instance, if the neural network 60 is provided with the crescent moon 45 (FIG. 3A) as an input, the neural network 60 can reproduce the crescent moon 45 as an approximate input.

Supervised Learning

A neural network, in accordance with an embodiment of the invention, may be trained for supervised learning (hetero-associative memory). The neural network learns to associate a provided input with a provided output (the output is essentially another provided input to the neural network). When fed the provided input, the neural network produces an approximation of the output. When fed the provided output, the neural network produces an approximation of the input. For example, when a neural network including visual sensors is provided a crescent moon shape as a provided input and a cross shape as a provided output, the neural network learns the crescent moon shape and the cross shape by application of learning rules to the synapses based on spiking neurons, and reproduces the crescent moon shape as an approximation of the input (approximate input) and the cross shape as an approximation of the output (approximate output).

Figure 7A:
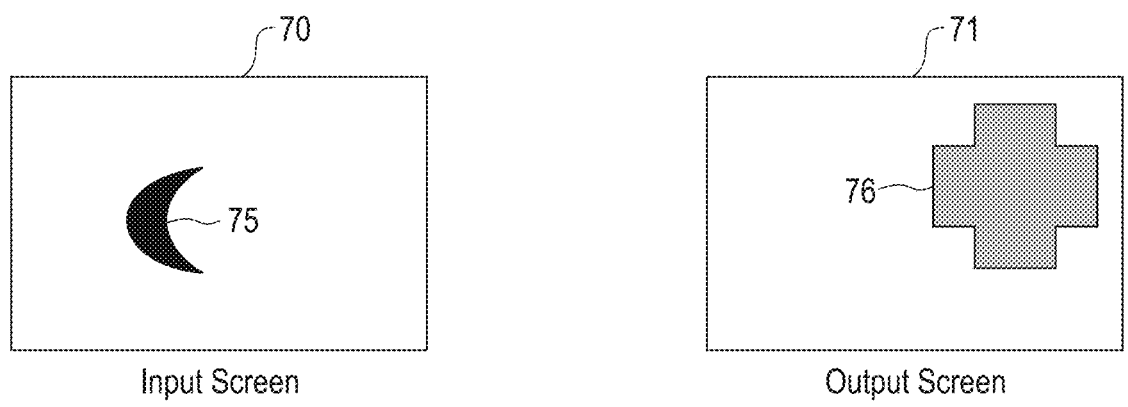
FIG. 7A illustrates an example input and an example output provided to a neuron in a neural network, in accordance with an embodiment of the invention.

FIG. 7A illustrates an example input and an example output provided to a neural network, in accordance with an embodiment of the invention. An input screen 70 provides a crescent moon 75 as input to the neural network. An output screen 71 provides a cross 76 as input to the neural network.

Figure 7B:
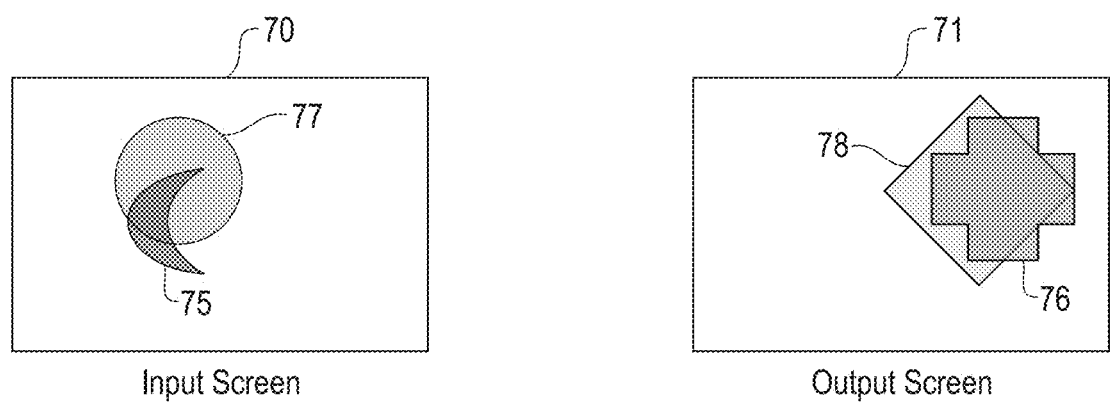
FIG. 7B illustrates a receptive field of a neuron in a neural network, in accordance with an embodiment of the invention.

FIG. 7B illustrates a receptive field of a neuron in a neural network, in accordance with an embodiment of the invention. A circle 77 in the input screen 70 represents the region of the input screen 70 that a neuron in the neural network is receptive to (receptive field). The input processed by the neural network will be a union of multiple such receptive fields. A diamond 78 in the output screen 71 represents the region of the output screen 71 that a neuron in the neural network is receptive to (receptive field). The output processed by the neural network will be a union of multiple such receptive fields.

Figure 7C:
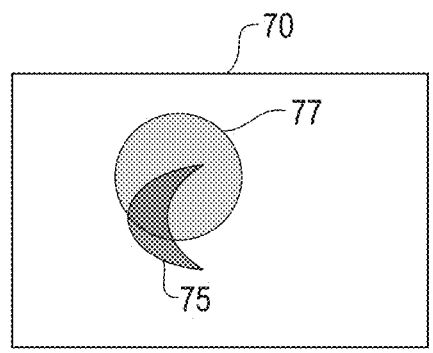
FIG. 7C illustrates a projective field of a neuron in a neural network, in accordance with an embodiment of the invention.
Figure 7C:
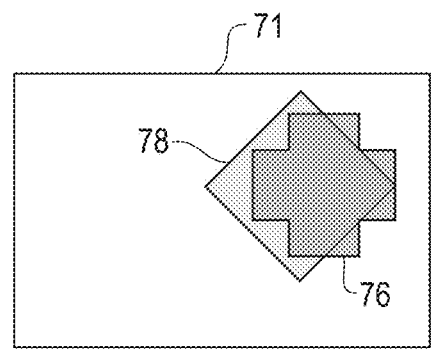
Figure 7C:
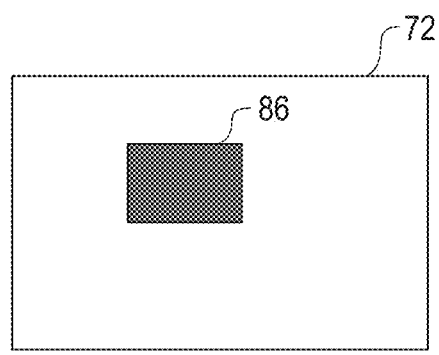
Figure 7C:
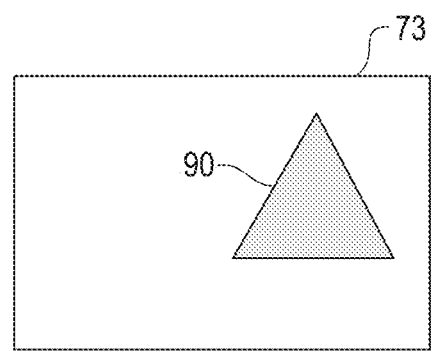

FIG. 7C illustrates a projective field of a neuron in a neural network, in accordance with an embodiment of the invention. A rectangle 86 in an approximate input screen 72 represents the projective field of a neuron in the neural network. The approximate input produced by the neural network will be a union of multiple such projective fields. A triangle 90 in an approximate output screen 73 represents the projective field of a neuron in the neural network. The approximate output produced by the neural network will be a union of multiple such projective fields.

Figure 7D:
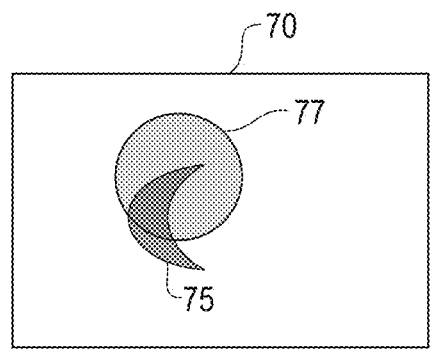
FIG. 7D illustrates an example input and an example output provided to a neural network intersecting with a receptive field and a projective field of a neuron in the neural network, in accordance with an embodiment of the invention.
Figure 7D:
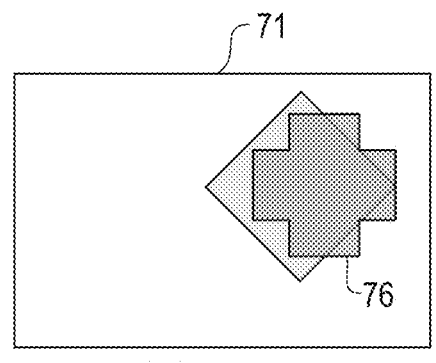
Figure 7D:
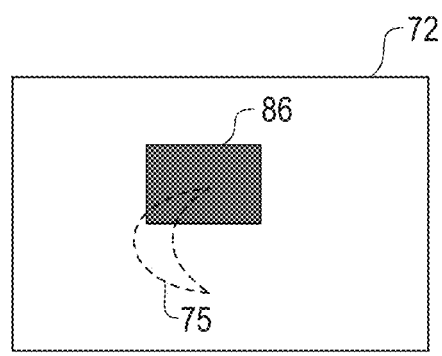
Figure 7D:
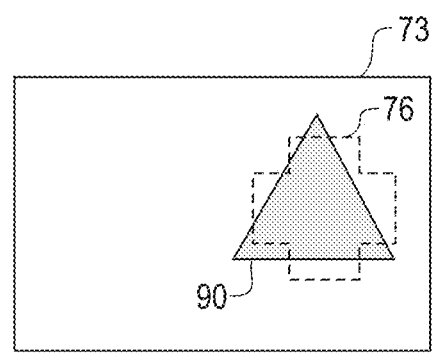

FIG. 7D illustrates an example input and an example output provided to a neural network intersecting with a receptive field and a projective field of a neuron in the neural network, in accordance with an embodiment of the invention. In input screen 70, the neural network is listening to the region represented by the circle 77 when it should only be listening to region represented by the crescent moon 75. Similarly, in output screen 71, the neural network is listening to the region represented by the diamond 78 (FIG. 7C) when it should only be listening to the region represented by the cross 76.

Also shown in FIG. 7D, in approximate input screen 72, the neural network produces the rectangle 86 as its approximate input when it should be producing the crescent moon 75. Similarly, in approximate output screen 73, the neural network produces the triangle 90 as its approximate output when it should be producing the cross 76.

Figure 7E:
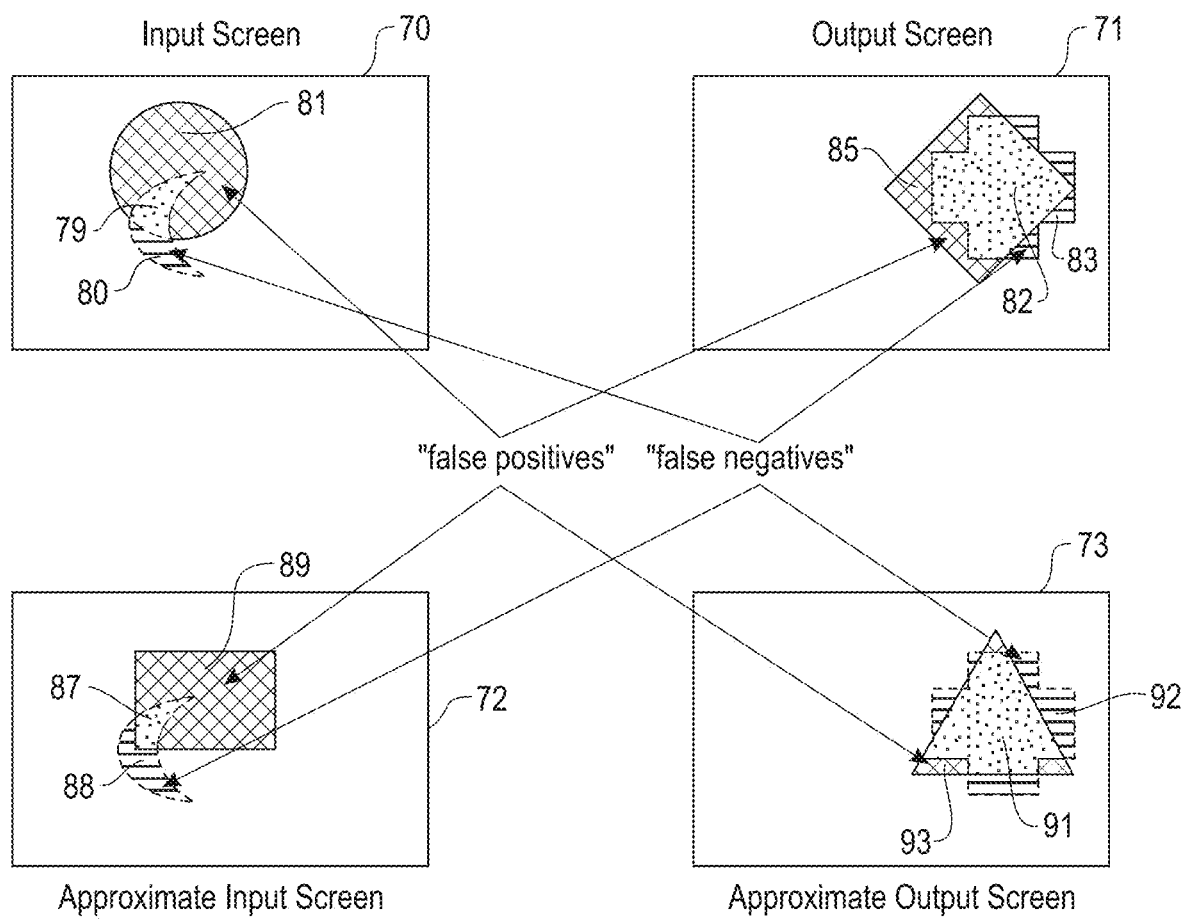
FIG. 7E illustrates an example input and an example output provided to a neural network intersecting with a receptive field and a projective field of a neuron in the neural network, in accordance with an embodiment of the invention.

FIG. 7E illustrates an example input and an example output provided to a neural network intersecting with a receptive field and a projective field of a neuron in the neural network, in accordance with an embodiment of the invention. In the input screen 70, a region 79 where the crescent moon 75 and the circle 77 (FIG. 7C) intersect represents an area of the crescent moon 75 that the neural network has learned. A region 80 where the crescent moon 75 does not intersect with the circle 77 represents a region of the input screen 70 that the neural network should be listening to but is not. The region 80 is a false negative that the neural network should be trained to learn. A region 81 where the circle 77 does not intersect with the crescent moon 75 represents a region of the input screen 70 that the neural network should be ignoring but is listening to instead. The region 81 is a false positive that the neural network should be trained to unlearn.

Also shown in FIG. 7E, in the output screen 71, a region 82 where the cross 76 and the diamond 78 intersect represents an area of the cross 76 that the neural network has learned. A region 83 where the cross 76 does not intersect with the diamond 78 represents a region of the output screen 71 that the neural network should be listening to but is not. The region 83 is a false negative that the neural network should be trained to learn. A region 85 where the diamond 78 does not intersect with the cross 76 represents a region of the output screen 71 that the neural network should be ignoring but is listening to instead. The region 85 is a false positive that the neural network should be trained to unlearn.

Further shown in FIG. 7E, in the approximate input screen 72, a region 87 where the crescent moon 75 and the rectangle 86 intersect represents an area of the crescent moon 75 that the neural network has produced. A region 88 where the crescent moon 75 does not intersect with the rectangle 86 represents a region of the approximate input screen 72 that the neural network should project but is not. The region 88 is a false negative that the neural network should be trained to learn. A region 89 where the rectangle 86 intersects with the crescent moon 75 represents a region of the approximate input screen 72 that the neural network should be ignoring but is projecting instead. The region 89 is a false positive that the neural network should be trained to unlearn.

Also shown in FIG. 7E, in the approximate output screen 73, a region 91 where the cross 76 and the triangle 90 intersect represents an area of the cross 76 that the neural network has produced. A region 92 where the cross 76 does not intersect with the triangle 90 represents a region of the approximate output screen 73 that the neural network should project but is not. The region 92 is a false negative that the neural network should be trained to learn. A region 93 where the triangle 90 does not intersect with the cross 76 represents a region of the approximate output screen that the neural network should be ignoring but is projecting instead. The area 93 is a false positive that the neural network should be trained to unlearn.

In one example implementation, to accomplish supervised learning in a neural network, the neural network may be trained to unlearn the false positives (see, for example, regions 81, 85, 89, 93 in FIG. 7E), learn the false negatives (see, for example, regions 80, 83, 88, 92 in FIG. 7E), and maintain what is correct (see, for example, regions 79, 82, 87, 91 in FIG. 7E). Using the neural network in FIG. 1, the present invention provides a neural network capable of self-tuning itself to achieve supervised learning by learning the false negatives, unlearning the false positives, and maintaining what is correct.

Figure 8:
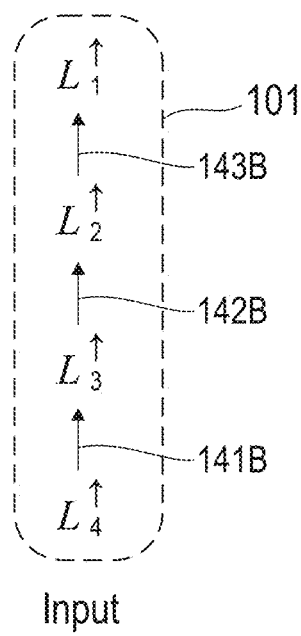
FIG. 8 illustrates a directed graph representing a feedforward learning structure implementing an embodiment of spiking computation in accordance with the present invention.

FIG. 8 illustrates a directed graph representing a feedforward learning structure 100 implementing an embodiment of spiking computation in accordance with the present invention. The feedforward learning structure 100 comprises a learning, bottom-up pathway 101 comprising four neuron populations, $L_1^\uparrow$, $L_2^\uparrow$, $L_3^\uparrow$, and $L_4^\uparrow$. The pathway 101 further comprises three edges, 141B, 142B, and 143B.

Each neuron population in FIG. 8 comprises a set of neurons. Let $L_i^\uparrow = \{l_{i,1}^\uparrow, l_{i,2}^\uparrow, \ldots, l_{i,Ni}^\uparrow\}$, i=1, 2, 3, 4, denote the set of all neurons within a neuron population in the learning, bottom-up pathway 101. The synaptic weight from a neuron $n_{i+1,\alpha}^\uparrow$ to a neuron $n_{i,\beta}^\uparrow$ is a weight $w_{\alpha,\beta}^{i+1}$. Input is provided to the neurons in the neuron population $L_4^\uparrow$ and an approximate output is produced by the neurons in the neuron population $L_1^\uparrow$.

The edge 141B comprises a weighted synaptic connection between every neuron in the neuron population $L_4^\uparrow$ and a corresponding neuron in the neuron population $L_3^\uparrow$. The edge 142B comprises a weighted synaptic connection between every neuron in the neuron population $L_3^\uparrow$ and a corresponding neuron in the neuron population $L_2^\uparrow$. The edge 143B comprises a weighted synaptic connection between every neuron in the neuron population $L_2^\uparrow$ and a corresponding neuron in the neuron population $L_1^\uparrow$.

Figure 9:
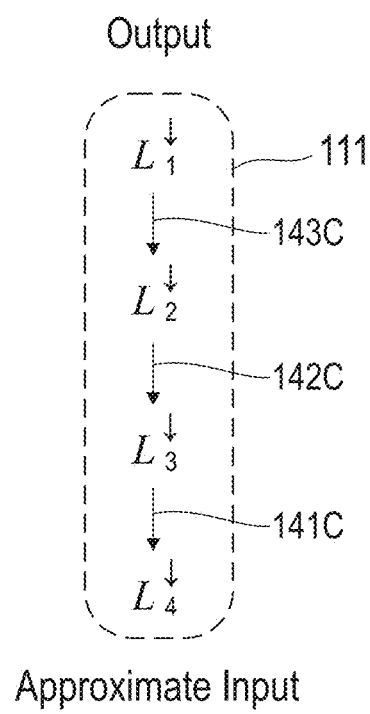
FIG. 9 illustrates a directed graph representing a feedback learning structure implementing an embodiment of spiking computation in accordance with the present invention.

FIG. 9 illustrates a directed graph representing a feedback learning structure 110 implementing an embodiment of spiking computation in accordance with the present invention. The feedback learning structure 110 comprises a learning, top-down pathway 111 comprising four neuron populations, $L_1^\downarrow$, $L_2^\downarrow$, $L_3^\downarrow$, and $L_4^\downarrow$. The pathway 111 further comprises three edges, 141C, 142C, and 143C.

Each neuron population in FIG. 9 comprises a set of neurons. Let $L_i^\downarrow = \{l_{i,1}^\downarrow, l_{i,2}^\downarrow, \ldots, l_{i,Ni}^\downarrow\}$), i=1, 2, 3, 4, denote the set of all neurons within a neuron population in the learning, top-down pathway 110. The synaptic weight from a neuron $n_{i,\beta}^\downarrow$ to a neuron $n_{i+1,\alpha}^\downarrow$ is a weight $w_{\alpha,\beta}^{i+1}$. Output is provided to the neurons in the neuron population Lit and an approximate input is produced by the neurons in the neuron population $L_4^\downarrow$.

The edge 141C comprises a weighted synaptic connection between every neuron in the neuron population $L_4^\downarrow$ and a corresponding neuron in the neuron population $L_3^\downarrow$. The edge 142C comprises a weighted synaptic connection between every neuron in the neuron population $L_3^\downarrow$ and a corresponding neuron in the neuron population $L_2^\downarrow$. The edge 143C comprises a weighted synaptic connection between every neuron in the neuron population $L_2^\downarrow$ and a corresponding neuron in the neuron population $L_1^\downarrow$.

FIG. 10 illustrates a directed graph representing a feedforward unlearning structure 120 implementing an embodiment of spiking computation in accordance with the present invention. The feedforward unlearning structure 120 comprises an unlearning, bottom-up pathway 121 comprising four neuron populations, $U_1^{\uparrow 1}$, $U_2^\uparrow$, $U_3^\uparrow$, and $U_4^\uparrow$. The pathway 121 further comprises three edges, 141A, 142A, and 143A.

Each neuron population in FIG. 10 comprises a set of neurons. Let $U_i^\uparrow = \{u_{i,1}^\downarrow, u_{i,2}^\uparrow, \ldots, u_{i,Ni}^\uparrow\}$, i=1, 2, 3, 4, denote the set of all neurons within a neuron population in the unlearning, bottom-up pathway 121. The synaptic weight from a neuron $u_{i+1,\alpha}^\uparrow$ to a neuron $u_{i,\beta}^\uparrow$ is a weight $w_{\alpha,\beta}^{i+1}$.

The edge 141A comprises a weighted synaptic connection between every neuron in the neuron population $U_4^\uparrow$ and a corresponding neuron in the neuron population $U_3^\uparrow$. The edge 142A comprises a weighted synaptic connection between every neuron in the neuron population $U_3^\uparrow$ and a corresponding neuron in the neuron population $U_2^\uparrow$. The edge 143A comprises a weighted synaptic connection between every neuron in the neuron population $U_2^\uparrow$ and a corresponding neuron in the neuron population $U_1^\uparrow$.

FIG. 11 illustrates a directed graph representing a feedback unlearning structure 130 by implementing an embodiment of spiking computation in accordance with the present invention. The feedback unlearning structure 130 comprises an unlearning, top-down pathway 131 comprising four neuron populations, $U_1^\downarrow$, $U_2^\downarrow$, $U_3^\downarrow$, and $U_4^\downarrow$. The pathway 131 further comprises three edges, 141D, 142D, and 143D.

Each neuron population in FIG. 11 comprises a set of neurons. Let $U_i^\downarrow = \{u_{i,1}^\downarrow, u_{i,2}^\downarrow, \ldots, u_{i,Ni}^\downarrow\}$, i=1, 2, 3, 4, denote the set of all neurons within a neuron population in the unlearning, top-down pathway 131. The synaptic weight from a neuron $u_{i,\beta}^\uparrow$ to a neuron $u_{i+1,\alpha}^\downarrow$ is a weight $w_{\alpha,\beta}^{i+1}$.

The edge 141D comprises a weighted synaptic connection between every neuron in the neuron population $U_4^\downarrow$ and a corresponding neuron in the neuron population $U_3^\downarrow$. The edge 142D comprises a weighted synaptic connection between every neuron in the neuron population $U_3^\downarrow$ and a corresponding neuron in the neuron population $U_2^\downarrow$. The edge 143D comprises a weighted synaptic connection between every neuron in the neuron population $U_2^\downarrow$ and a corresponding neuron in the neuron population $U_1^\downarrow$.

Figure 12:
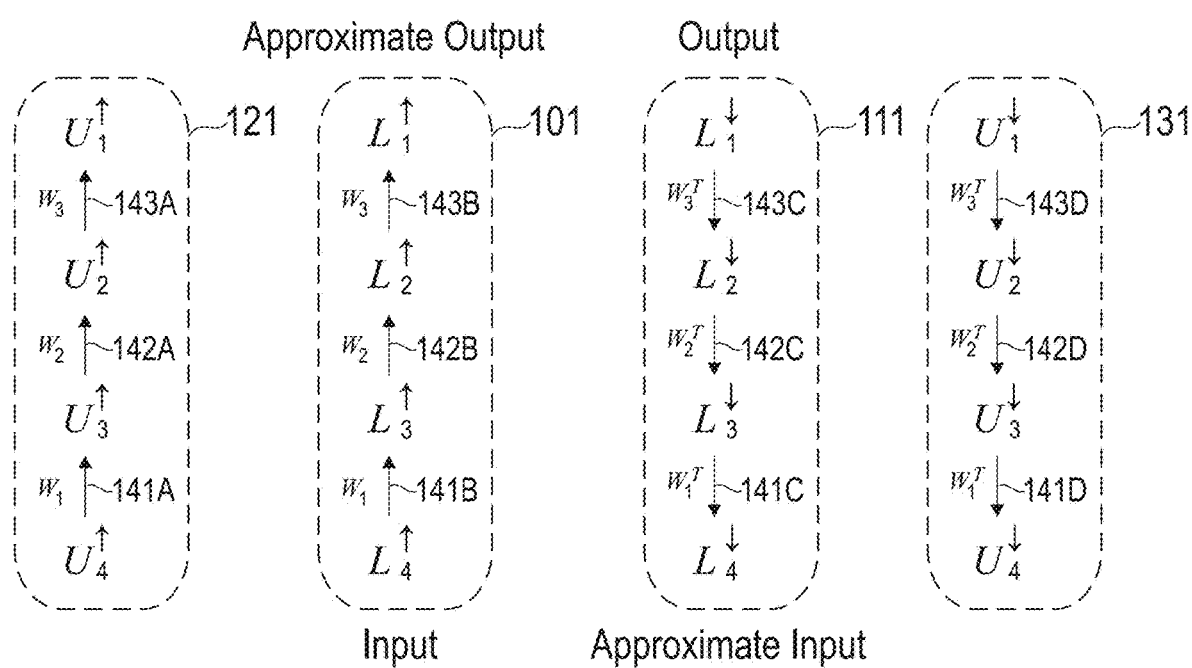
FIG. 12 illustrates a directed graph representing a neural network structure trained for supervised, unsupervised and reinforcement learning by implementing an embodiment of spiking computation in accordance with the present invention.

FIG. 12 illustrates a neural network structure 140 trained for supervised, unsupervised and reinforcement learning by implementing an embodiment of spiking computation in accordance with the present invention. The neural network structure 140 comprises edges 141A, 141B, 141C, 141D, 142A, 142B, 142C, 142D, 143A, 143B, 143C, and 143D, a learning, bottom-up pathway 101, a learning, top-down pathway 111, an unlearning, bottom-up pathway 121, an unlearning, top-down pathway 131, and sixteen neuron populations, $L_1^\uparrow$, $L_2^\uparrow$, $L_3^\uparrow$, $L_4^\uparrow$, $L_1^\downarrow$, $L_2^\downarrow$, $L_3^\downarrow$, $L_4^\downarrow$, $U_1^\uparrow$, $U_2^\uparrow$, $U_3^\uparrow$, $U_4^\uparrow$, $U_1^\downarrow$, $U_2^\downarrow$, $U_3^\downarrow$, and $U_4^\downarrow$.

As in FIG. 8, the learning, bottom-up learning pathway 101 in FIG. 12 comprises the neuron populations $L_1^\uparrow$, $L_2^\uparrow$, $L_3^\uparrow$, and $L_4^\uparrow$, and the edges 141B, 142B, and 143B. An input interface 172 (FIG. 1) provides input to the neurons in the neuron population $L_4^\uparrow$. The neurons in the neuron population $L_1^\uparrow$ produce an approximate output. Firing/output events of the neurons in the neuron population $L_1^\uparrow$ are provided to the output interface 173 (FIG. 1). The pathway 101 can be used in the neural network 140 to learn false negatives (e.g. input).

For example, the neuron population $L_4^\uparrow$ population can include the neuron $l_i^\uparrow$ of the neural module 202 in FIG. 2B. The neuron population $L_3^\uparrow$ population can include the neuron $l_{i+1}^\uparrow$ of the neural module 203 in FIG. 2B. The edge 141B can include the weighted synaptic connection 210 interconnecting the neuron $l_i^\uparrow$ to the neuron $l_{i+1}^\uparrow$ in FIG. 2B.

As in FIG. 9, the learning, top-down pathway 111 in FIG. 12 comprises the neuron populations $L_1^\downarrow$, $L_2^\downarrow$, $L_3^\downarrow$, and $L_4^\downarrow$, and the edges 141C, 142C, and 143C. Output is provided to the neurons in the neuron population $L_1^\downarrow$, and the neurons in the neuron population $L_4^\downarrow$ produce an approximate input. The pathway 111 can be used in the neural network 140 to learn false negatives (e.g. input).

For example, the neuron population $L_4^\downarrow$ population can include the neuron $l_i^\downarrow$ of the neural module 202 in FIG. 2B. The neuron population $L_3^\downarrow$ population can include the neuron $l_{i+1}^\downarrow$ of the neural module 203 in FIG. 2B. The edge 141C can include the weighted synaptic connection 220 interconnecting the neuron lit to the neuron $l_{i+1}^\downarrow$ in FIG. 2B.

As in FIG. 10, the unlearning, bottom-up pathway 121 in FIG. 12 comprises the neuron populations $U_1^\downarrow$, $U_2^\downarrow$, $U_3^\downarrow$, and $U_4^\downarrow$, and the edges 141A, 142A, and 143A. The pathway 121 can be used in the neural network 140 to unlearn false positives (e.g. network-created information).

For example, the neuron population $U_4^\uparrow$ population can include the neuron $u_i^\uparrow$ of the neural module 202 in FIG. 2B. The neuron population $U_3^\uparrow$ population can include the neuron $u_{i+1}^\uparrow$ of the neural module 203 in FIG. 2B. The edge 141A can include the weighted synaptic connection 230 interconnecting the neuron $u_i^\uparrow$ to the neuron $u_{i+1}^\uparrow$ in FIG. 2B.

As in FIG. 11, the unlearning, top-down pathway 131 in FIG. 12 comprises the neuron populations $U_1^\downarrow$, $U_2^\downarrow$, $U_3^\downarrow$, and $U_4^\downarrow$, and the edges 141D, 142D, and 143D. The pathway 131 can be used in the neural network 140 to unlearn false positives (network-created information).

For example, the neuron population $U_4^\downarrow$ population can include the neuron $u_i^\downarrow$ of the neural module 202 in FIG. 2B. The neuron population $U_3^\downarrow$ population can include the neuron $u_{i+1}^\downarrow$ of the neural module 203 in FIG. 2B. The edge 141D can include the weighted synaptic connection 240 interconnecting the neuron $u_i^\downarrow$ to the neuron $u_{i+1}^\downarrow$ in FIG. 2B.

In FIG. 12, the synaptic weight of every weighted synaptic connection in the edge 141A is represented by a matrix $W_1$. The matrix $W_1$ is also used to represent the synaptic weight of every weighted synaptic connection in the edge 141B. The synaptic weight of every weighted synaptic connection in the edge 141C is represented by the transpose of the matrix $W_1$, $W_1^T$. The transpose of the matrix $W_1$, $W_1^T$, is also used to represent the synaptic weight of every weighted synaptic connection in the edge 141D. Thus, the matrix $W_1$ is used in four different contexts.

The synaptic weight of every weighted synaptic connection in the edge 142A is represented by a matrix $W_2$. The matrix $W_2$ is also used to represent the synaptic weight of every weighted synaptic connection in the edge 142B. The synaptic weight of every weighted synaptic connection in the edge 142C is represented by the transpose of the matrix $W_2$, $W_2^T$. The transpose of the matrix $W_2$, $W_2^T$, is also used to represent the synaptic weight of every weighted synaptic connection in the edge 142D. Thus, the matrix $W_2$ is used in four different contexts.

The synaptic weight of every weighted synaptic connection in the edge 143A is represented by a matrix $W_3$. The matrix $W_3$ is also used to represent the synaptic weight of every weighted synaptic connection in the edge 143B. The synaptic weight of every weighted synaptic connection in the edge 143C is represented by the transpose of the matrix $W_3$, $W_3^T$. The transpose of the matrix $W_3$, $W_3^T$, is also used to represent the synaptic weight of every weighted synaptic connection in the edge 143D. Thus, the matrix $W_3$ is used in four different contexts.

Each matrix $W_1$, $W_2$, and $W_3$, and its transpose $W_1^T$, $W_2^T$, and $W_3^T$, is doubly stochastic. The weights of all weighted synaptic connections in the neural network 140 are adaptive as a function of the firing events of the interconnected neurons.

In one time step, each neuron in every neuron module updates its operational state and, based on its operational state, each said neuron determines whether to generate a firing event in response to firing events received as input signals by said neuron via weighted synaptic connections from neurons in other neural modules. Each said input signal is weighted by the weight of the weighted synaptic connection communicating said input signal to said neuron.

For instance, in the neural network 140, each time step is divided into four different phases. The operational state of each neuron in the neuron populations $L_1^\uparrow$, $L_2^\uparrow$, $L_3^\uparrow$, and $L_4^\uparrow$ is updated in one phase of a time step. The operational state of each neuron in the neuron populations $L_1^\downarrow$, $L_2^\downarrow$, $L_3^\downarrow$, and $L_4^\downarrow$ is updated in a second phase of the same time step. The operational state of each neuron in the neuron populations $U_1^\downarrow$, $U_2^\downarrow$, $U_3^\downarrow$, and $U_4^\downarrow$ is updated in a third phase of the same time step. The operational state of each neuron in the neuron populations $U_1^\uparrow$, $U_2^\uparrow$, $U_3^\uparrow$, and $U_4^\uparrow$ is updated in a fourth phase of the same time step.

The neural network 140 propagates information in a circular loop. The firing events generated by the neurons in the $L_1^\downarrow$ population are copied and provided as input to the neurons in the $L_1^\downarrow$ population. The firing events generated by the neurons in the $L_4^\downarrow$ population are also copied and provided as input to the neurons in the $U_4^\uparrow$ population.

Figure 13:
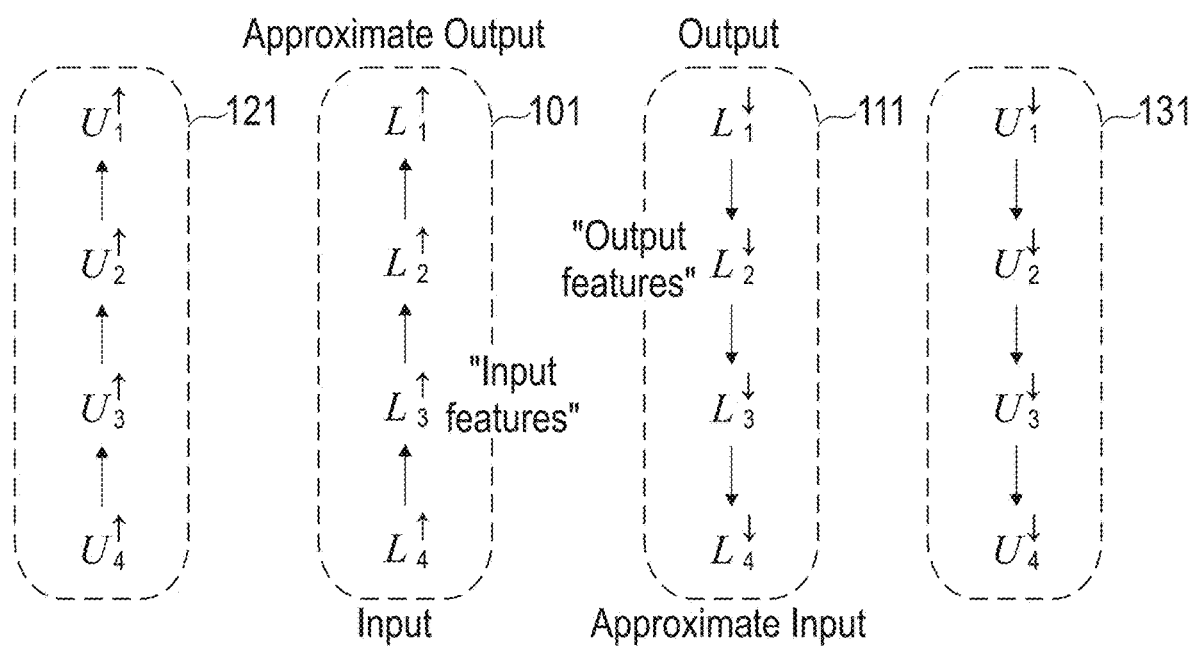
FIG. 13 illustrates a directed graph representing a neural network structure trained for supervised, unsupervised and reinforcement learning by implementing an embodiment of spiking computation in accordance with the present invention.

FIG. 13 illustrates a neural network structure 140 trained for supervised, unsupervised and reinforcement learning by implementing an embodiment of spiking computation in accordance with the present invention. Features of the input provided to the $L_4^\uparrow$ population, such as texture, color, etc., are extracted when the input propagates from the $L_4^\uparrow$ population to the $L_3^\uparrow$ population via the learning, bottom-up pathway 101. Similarly, features of the output provided to the $L_1^\downarrow$ population are extracted when the output propagates from the $L_1^\downarrow$ population to the $L_2^\downarrow$ population via the learning, top-down pathway 111. Thus, the neural network structure 140 is trained to associate the features of the input provided with the features of the output provided, and vice versa.

Figure 14:
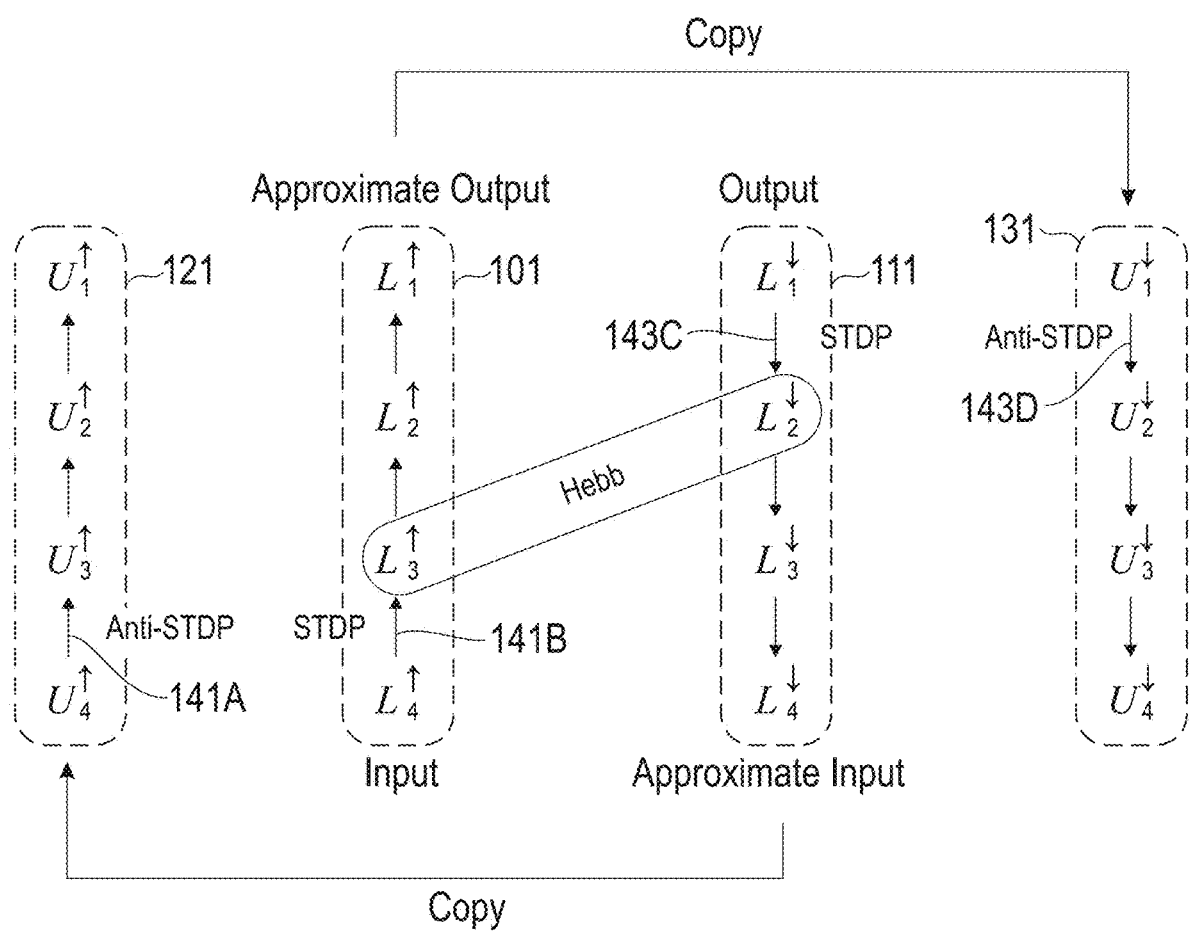
FIG. 14 illustrates a directed graph representing a neural network structure trained for supervised, unsupervised and reinforcement learning by implementing an embodiment of spiking computation in accordance with the present invention.

FIG. 14 illustrates a neural network structure 140 trained for supervised, unsupervised and reinforcement learning by implementing an embodiment of spiking computation in accordance with the present invention. Learning rules are applied to the weighted synaptic connections in the same time step that each neuron in each neural module updates its operational states. The learning rules are applied based on the firing activity of interconnected neurons in a previous time step. The neural network 140 further comprises an interface module 171 (FIG. 1) configured for updating learning rules associated with each weighted synaptic connection in the interconnection network.

As shown in FIG. 14, heavy learning occurs by applying a STDP learning rule to the weighted synaptic connections in the edge 141B. The firing activity of the neurons in the neuron population $L_4^\uparrow$ is amplified as it propagates to the neurons in the neuron population $L_3^\uparrow$ via the weighted synaptic connections in the edge 141B. In this manner, the input provided to the neurons in the neuron population $L_4^\uparrow$ is learned by the neural network 140.

Similarly, as shown in FIG. 14, heavy learning occurs by applying a STDP learning rule to the weighted synaptic connections in the edge 143C. The firing activity of the neurons in the neuron population $L_1^\downarrow$ is amplified as it propagates to the neurons in the neuron population $L_2^\downarrow$ via the weighted synaptic connections in the edge 143C. In this manner, the output provided to the neurons in the neuron population $L_1^\downarrow$ is learned by the neural network 140.

The firing events produced by the neurons in the neuron population $L_4^\downarrow$, however, are network-created, and this network-created information may be unlearned by the neural network 140. As such, the firing events produced by the $L_4^\downarrow$ population are copied and provided as input to the neurons in the neuron population $U_2^\uparrow$. An anti-STDP learning rule is applied to the weighted synaptic connections in the edge 141A to unlearn the network-created information.

Similarly, the firing events produced by the neurons in the neuron population $L_1^\uparrow$, however, are network-created, and this network-created information may be unlearned by the neural network 140. As such, the firing events produced by the $L_1^\uparrow$ population are copied and provided as input to the neurons in the neuron population $U_1^\downarrow$. An anti-STDP learning rule is applied to the weighted synaptic connections in the edge 143D to unlearn the network-created information.

The learning rules STDP and anti-STDP are augmented by Hebb and anti-Hebb, respectively. For instance, Hebb learning based on the firing activity of the neurons in the neuron populations $L_3^\uparrow$ and $L_2^\downarrow$ is applied to adjust the synaptic weights of the weighted synaptic connections in the neural network 140.

After training, the neural network 140 can produce the output as an approximate output when provided with the input. Likewise, the neural network 140 can produce the input as an approximate input when provided with the output. For instance, if the neural network 140 is provided with the crescent moon 75 (FIG. 7A) as an input, the neural network 140 can produce the cross 76 (FIG. 7A) as an approximate output.

Figure 15:
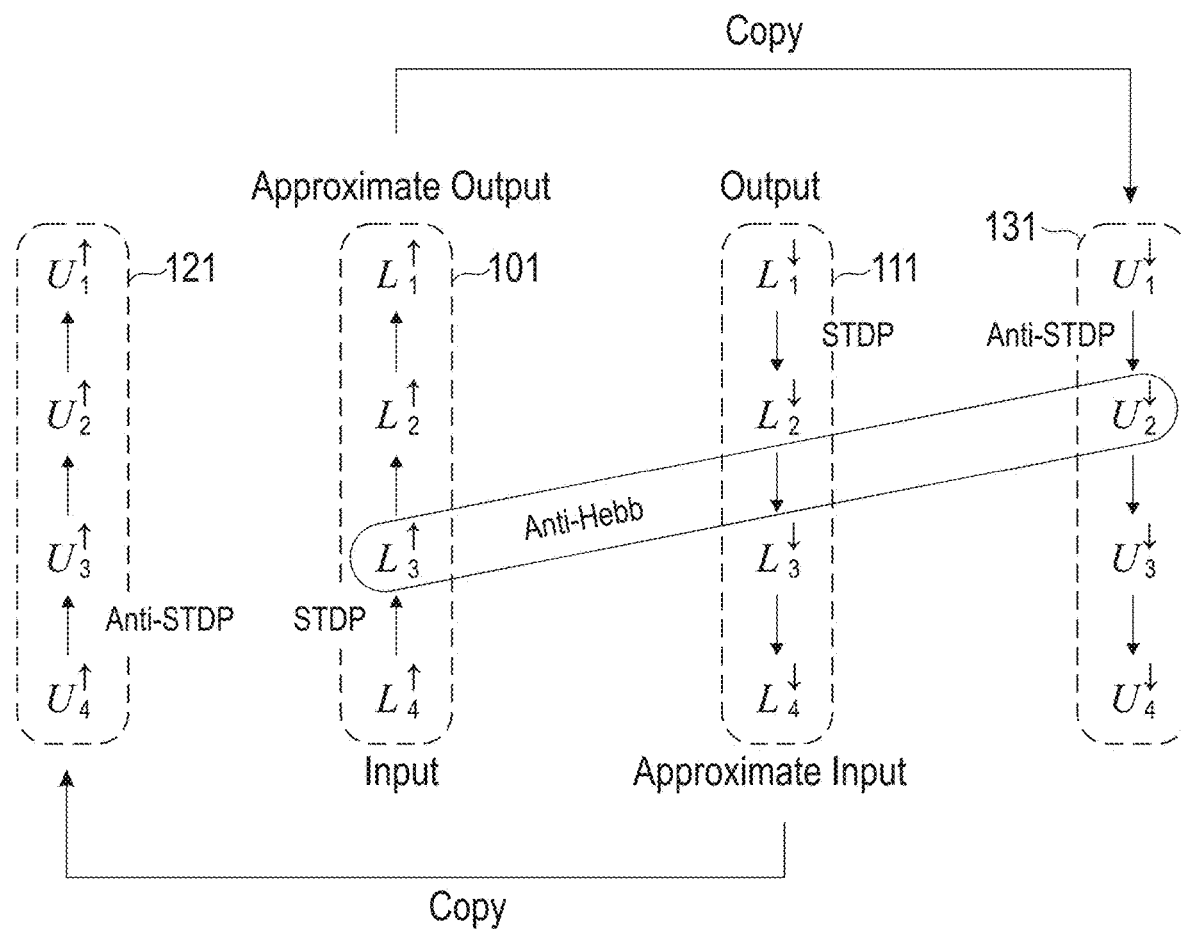
FIG. 15 illustrates a directed graph representing a neural network structure trained for supervised, unsupervised and reinforcement learning by implementing an embodiment of spiking computation in accordance with the present invention.

FIG. 15 illustrates a neural network structure 140 trained for supervised, unsupervised and reinforcement learning with learning rules applied, in accordance with an embodiment of the invention. Anti-Hebb learning based on the firing activity of the neurons in the neuron populations $L_3^\uparrow$ and $U_2^\downarrow$ is applied to adjust the synaptic weights of the weighted synaptic connections in the neural network 140.

Figure 16:
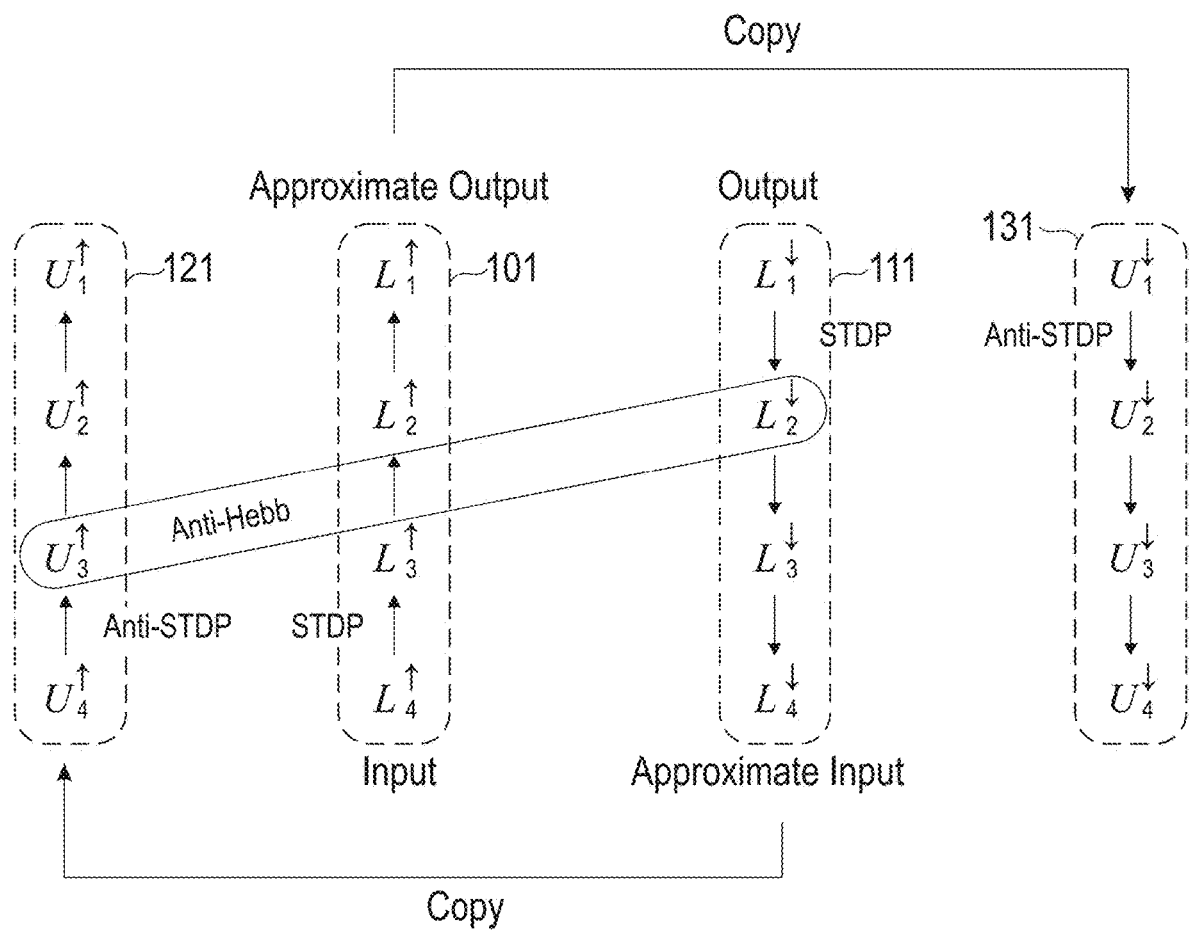
FIG. 16 illustrates a directed graph representing a neural network structure trained for supervised, unsupervised and reinforcement learning by implementing an embodiment of spiking computation in accordance with the present invention.

FIG. 16 illustrates a neural network structure 140 trained for supervised, unsupervised and reinforcement learning with learning rules applied, in accordance with an embodiment of the invention. Anti-Hebb learning based on the firing activity of the neurons in the neuron populations $U_3^\uparrow$ and $L_2^\downarrow$ is applied to adjust the synaptic weights of the weighted synaptic connections in the neural network 140.

Unsupervised learning can be realized as a sub-function of the neural network 140 in FIG. 12. To train the neural network 140 in unsupervised learning, the output provided to the $L_1^\downarrow$ population is set to the input provided to the $L_4^\uparrow$ population.

Reinforcement Learning

Figure 17:
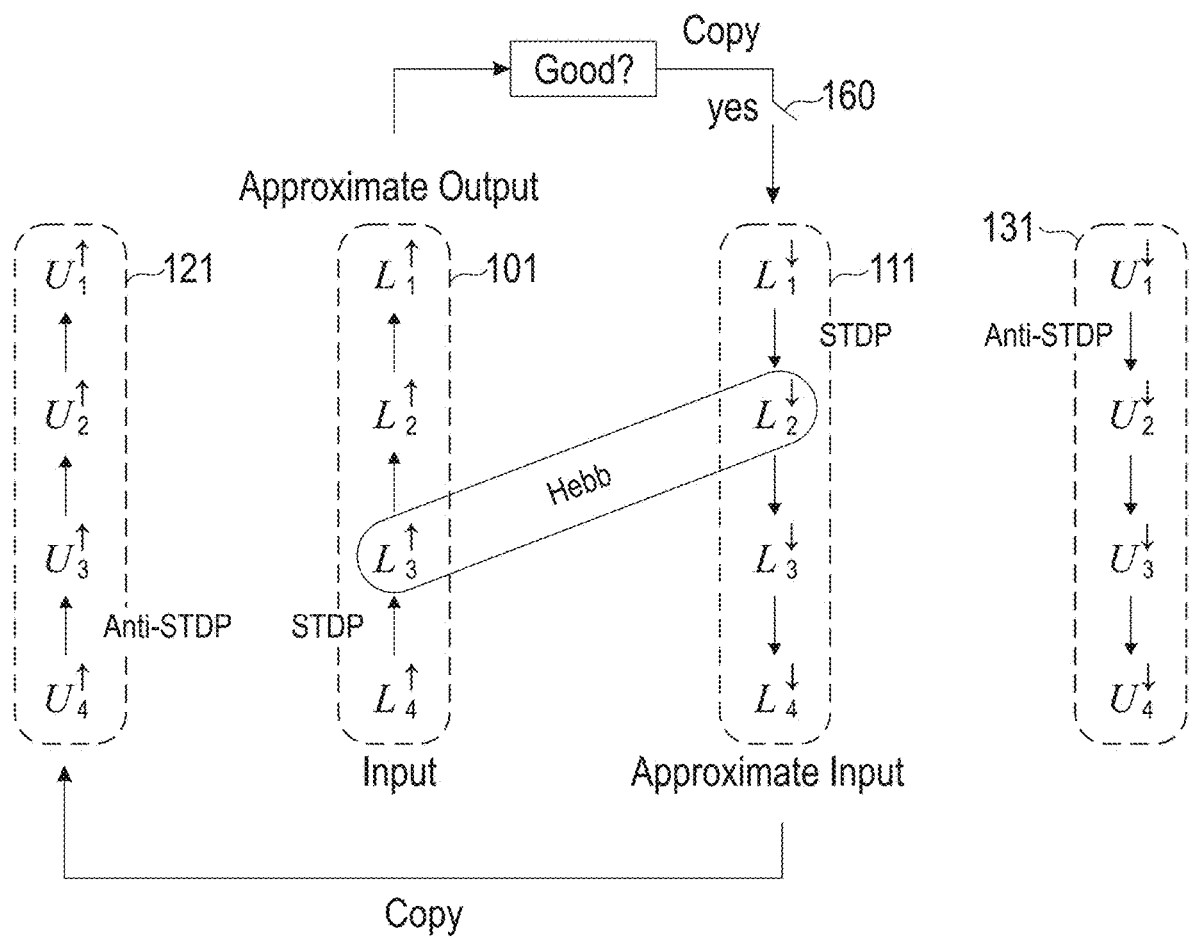
FIG. 17 illustrates a directed graph representing a neural network structure trained in supervised, unsupervised and reinforcement learning by implementing an embodiment of spiking computation in accordance with the present invention.

FIG. 17 illustrates a neural network structure 140 trained in supervised, unsupervised and reinforcement learning by implementing an embodiment of spiking computation in accordance with the present invention. Reinforcement learning can be realized as a sub-function of the neural network 140 in FIG. 12. The neural network 140 further comprises an evaluation module 170 (FIG. 1) configured for evaluating the firing events (approximate output) generated by the neurons in the neuron population $L_1^\uparrow$.

If the approximate output is good, the evaluation module 170 copies the approximate output and provides it as input to the neurons in the neuron population $L_1^\downarrow$. A switch 160 in the neural network 140 closes to propagate the approximate output to the neurons in the neuron population $L_1^\downarrow$. The approximate output is learned as it propagates down to the $L_4^\downarrow$ population via the learning, top-down learning pathway 111. Hebb learning based on the firing activity of the neurons in the neuron populations $L_3^\uparrow$ and $L_2^\downarrow$ is applied to adjust the synaptic weights of the weighted synaptic connections in the neural network 140.

Figure 18:
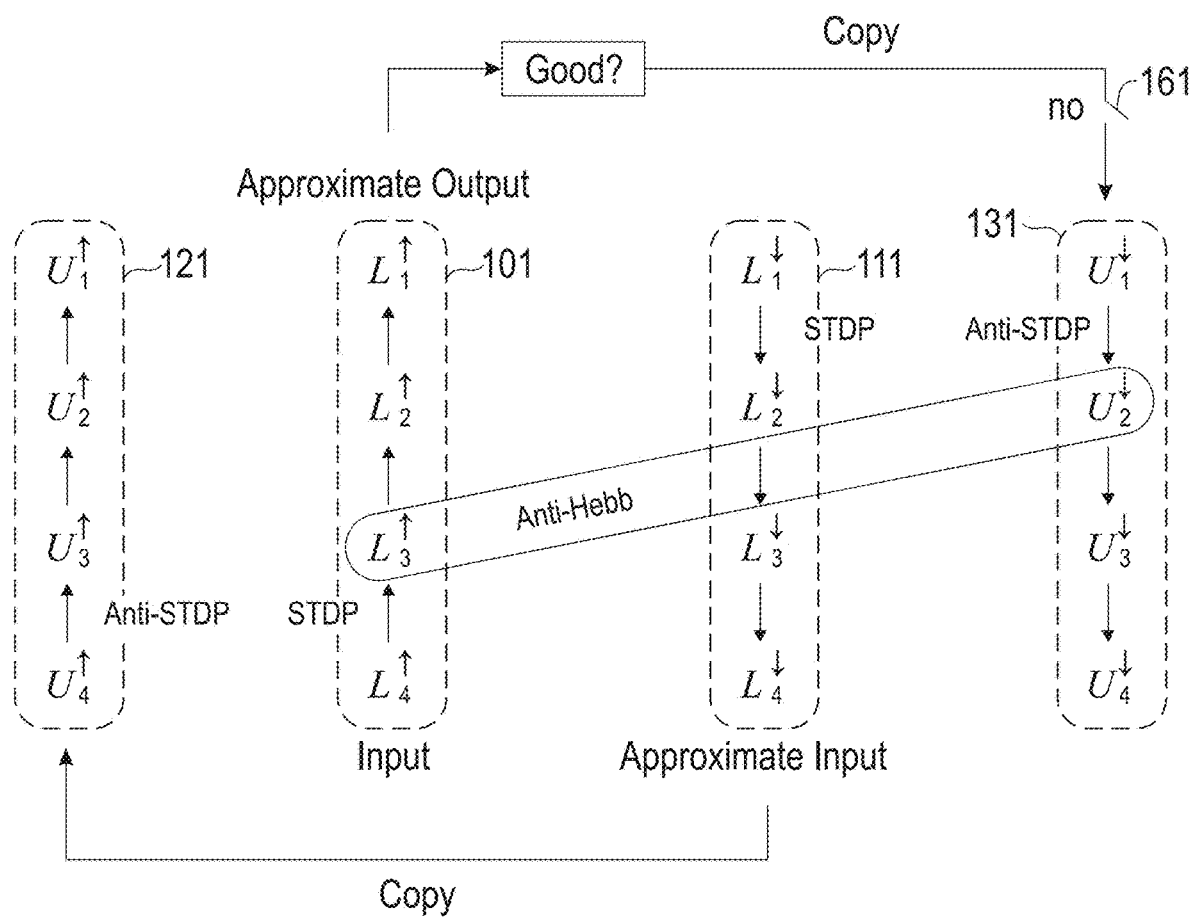
FIG. 18 illustrates a directed graph representing a neural network structure trained in supervised, unsupervised and reinforcement learning by implementing an embodiment of spiking computation in accordance with the present invention.

FIG. 18 illustrates a neural network structure 140 trained in supervised, unsupervised and reinforcement learning with learning rules applied, in accordance with an embodiment of the invention. If the approximate output is bad, the evaluation module 170 copies the approximate output and provides it as input to the neurons in the neuron population $U_1^\downarrow$ population. A switch 161 in the neural network 140 closes to propagate the approximate output to the neurons in the neuron population $U_1^\downarrow$. The approximate output is unlearned as it propagates down to the $U_4^\downarrow$ population via the unlearning, top-down unlearning pathway 131. Anti-Hebb learning based on the firing activity of the neurons in the neuron populations $L_3^\uparrow$ and $U_2^\downarrow$ is applied to adjust the synaptic weights of the weighted synaptic connections in the neural network 140.

Figure 19:
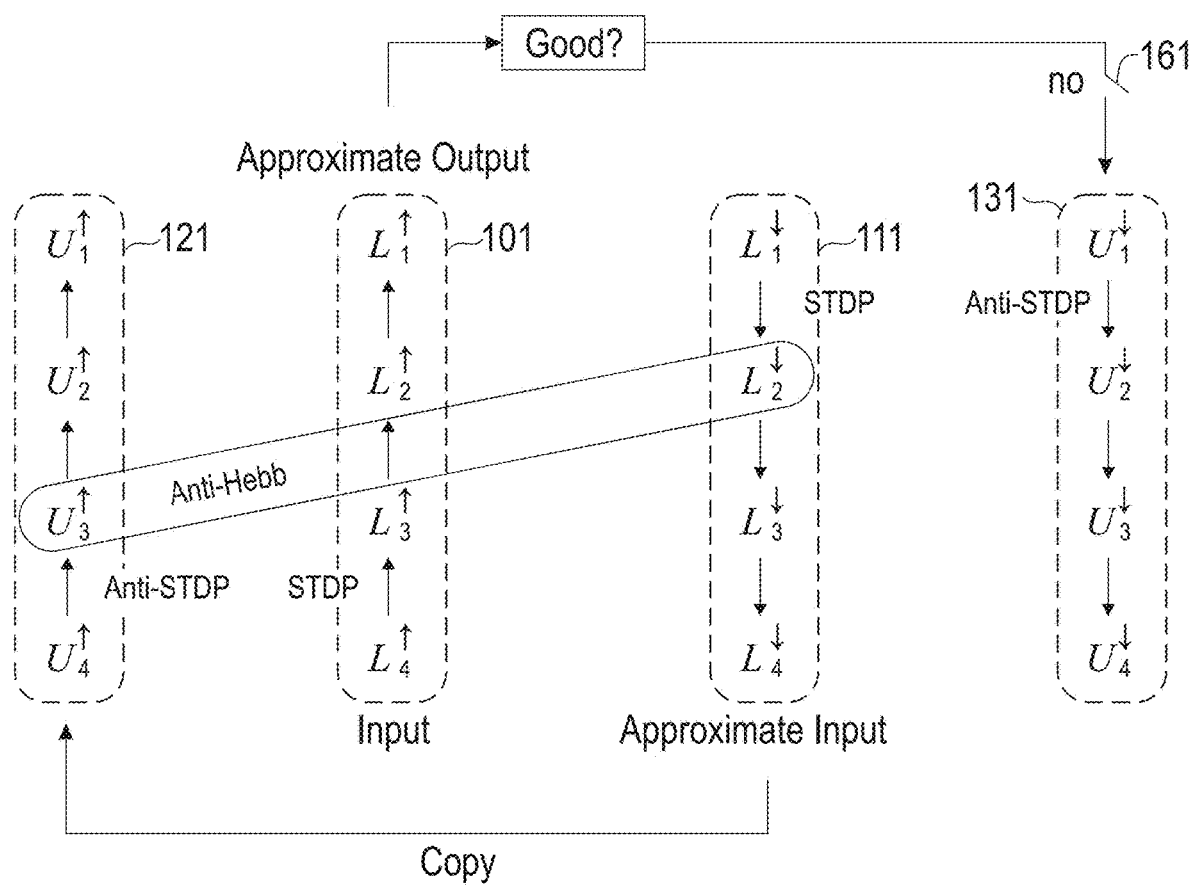
FIG. 19 illustrates a directed graph representing a neural network structure trained in supervised, unsupervised and reinforcement learning by implementing an embodiment of spiking computation in accordance with the present invention.

FIG. 19 illustrates a neural network structure 140 trained in supervised, unsupervised and reinforcement learning with learning rules applied, in accordance with an embodiment of the invention. Anti-Hebb learning based on the firing activity of the neurons in the neuron populations $U_3^\uparrow$ and $L_2^\downarrow$ is applied to adjust the synaptic weights of the weighted synaptic connections in the neural network 140.

After training, the neural network 140 will approximate the feedforward structure 100 in FIG. 8.

Figure 20:
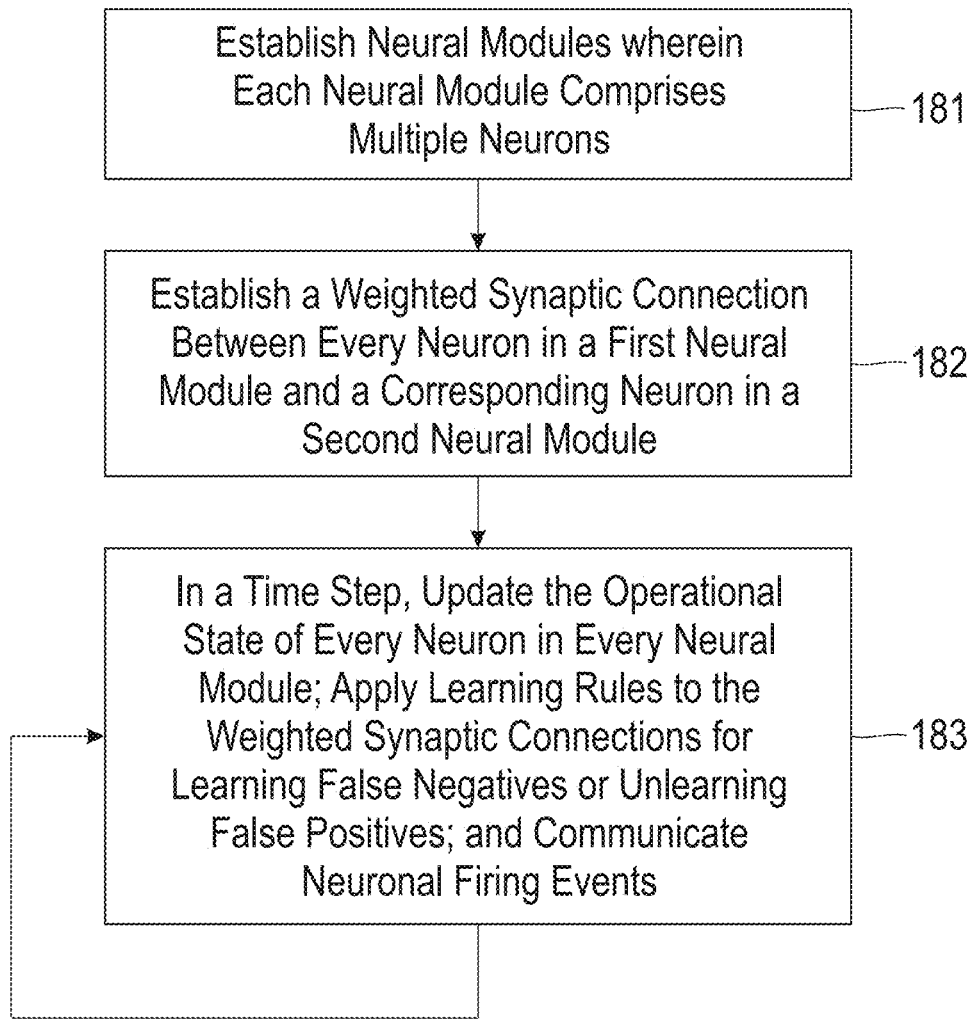
FIG. 20 illustrates a flowchart of an example process for training a neural network in supervised, unsupervised and reinforcement learning by implementing an embodiment of spiking computation, in accordance with an embodiment of the invention.

FIG. 20 illustrates a flowchart of an example process 180 for training a neural network in supervised, unsupervised and reinforcement learning by implementing an embodiment of spiking computation, in accordance with an embodiment of the invention. In one embodiment, the neural network may comprises a hierarchical routing fabric for neural modules, wherein the routing fabric provides two-way information flow and structural plasticity. Routing of information between the neural modules is adaptive. In one example, each neural module includes a plurality of incoming connections such that each incoming connection has a predetermined address, and each neural module includes a plurality of outgoing connections such that each outgoing connection targets an incoming connection in a neural module among the multiple neural modules. The routing fabric selectively routes signals among the neural modules based on a reconfigurable hierarchical organization. The routing fabric may comprise a routing table for each neural module, wherein each routing table includes routing information for a router to direct an incoming signal to another neural module. In one example, the routing table is within a neural module. In another example, the routing table may be external to the neural module.

In process block 181, the neural modules are established wherein each neural module comprises multiple neurons. In process block 182, a weighted synaptic connection between every neuron in a first neural module and a corresponding neuron in a second neural module is established. In process block 183, for every time step, the operational state of every neuron in every neural module is updated, learning rules are applied to the weighted synaptic connections for learning false negatives or unlearning false positives, and neuronal firing events are communicated. After process block 183, the invention repeats process block 183.

Figure 21:
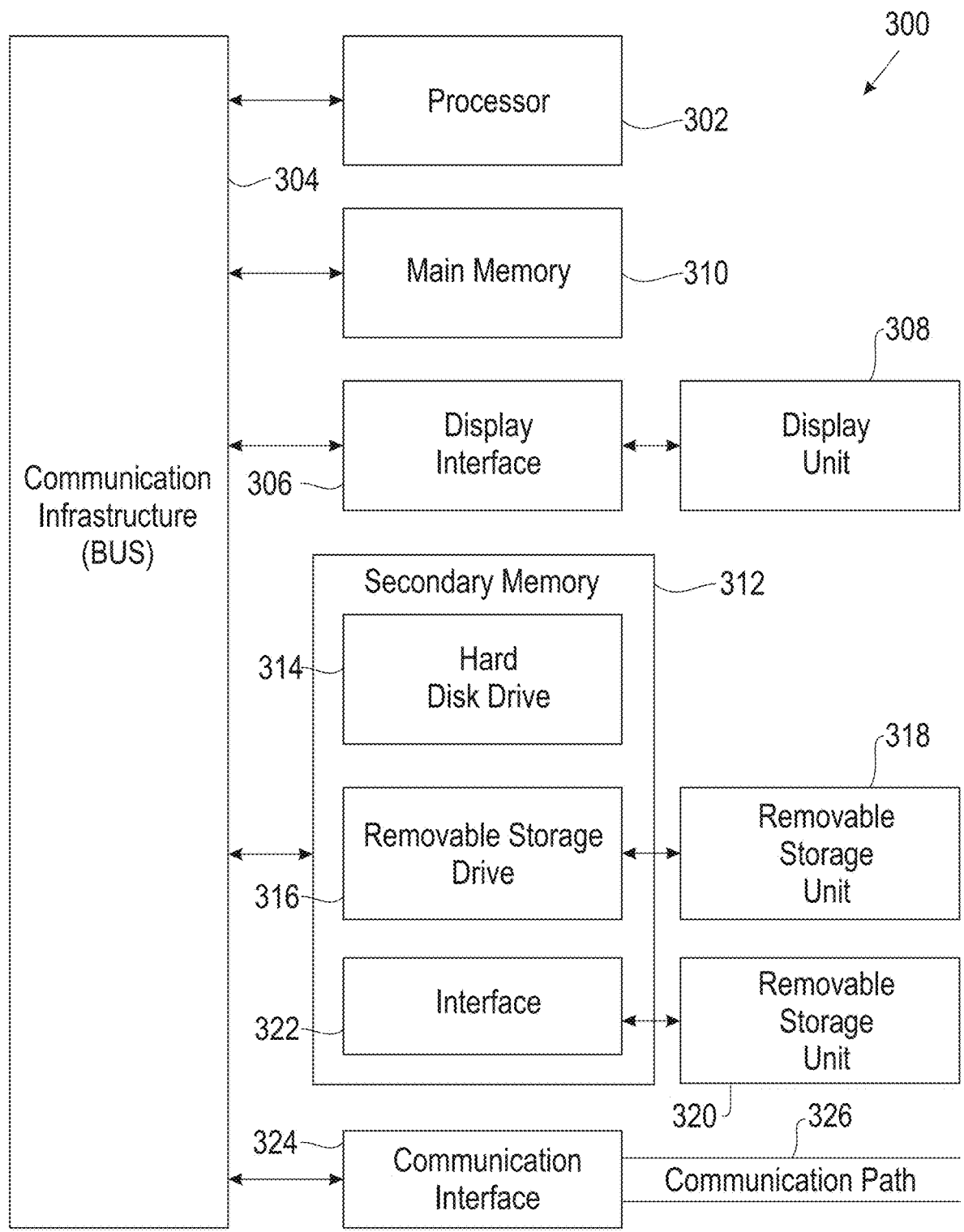
FIG. 21 is a high level block diagram showing an information processing circuit useful for implementing one embodiment of the present invention.

FIG. 21 is a high level block diagram showing an information processing circuit 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving output generated by a neuron population of a neural network;
    determining whether the output is a false negative or a false positive; and
    self-tuning the neural network by:
        providing the output to a first set of neuron populations of the neural network in response to determining the output is a false negative, wherein the output is learned as the output propagates through the first set of neuron populations; and
        providing the output to a second set of neuron populations of the neural network in response to determining the output is a false positive, wherein the output is unlearned as the output propagates through the second set of neuron populations.

2. The method of claim 1, wherein self-tuning the neural network further comprises:
    applying a first learning rule based on firing activity of the first set of neuron populations to adjust synaptic weights of a first set of pathways interconnecting the first set of neuron populations in response to determining the output is a false negative; and
    applying a second learning rule based on firing activity of the second set of neuron populations to adjust synaptic weights of a second set of pathways interconnecting the second set of neuron populations in response to determining the output is a false positive.

3. The method of claim 2, wherein the first learning rule is a Hebb learning rule and the second learning rule is an anti-Hebb learning rule.

4. The method of claim 2, wherein the first learning rule is a spike-timing dependent plasticity (STDP) learning rule and the second learning rule is an anti-STDP learning rule.

5. A system comprising a computer processor, a computer-readable hardware storage medium, and program code embodied with the computer-readable hardware storage medium for execution by the computer processor to implement a method comprising:
    receiving output generated by a neuron population of a neural network;
    determining whether the output is a false negative or a false positive; and
    self-tuning the neural network by:
        providing the output to a first set of neuron populations of the neural network in response to determining the output is a false negative, wherein the output is learned as the output propagates through the first set of neuron populations; and
        providing the output to a second set of neuron populations of the neural network in response to determining the output is a false positive, wherein the output is unlearned as the output propagates through the second set of neuron populations.

6. The system of claim 5, wherein self-tuning the neural network further comprises:
    applying a first learning rule based on firing activity of the first set of neuron populations to adjust synaptic weights of a first set of pathways interconnecting the first set of neuron populations in response to determining the output is a false negative; and
    applying a second learning rule based on firing activity of the second set of neuron populations to adjust synaptic weights of a second set of pathways interconnecting the second set of neuron populations in response to determining the output is a false positive.

7. The system of claim 6, wherein the first learning rule is a Hebb learning rule and the second learning rule is an anti-Hebb learning rule.

8. The system of claim 6, wherein the first learning rule is a spike-timing dependent plasticity (STDP) learning rule and the second learning rule is an anti-STDP learning rule.

9. A computer program product comprising a computer-readable hardware storage device having program code embodied therewith, the program code being executable by a computer to implement a method comprising:
    receiving output generated by a neuron population of a neural network;

determining whether the output is a false negative or a false positive; and self-tuning the neural network by:
provapiding the output to a first set of neuron populations of the neural network in response to determining the output is a false negative, wherein the output is learned as the output propagates through the first set of neuron populations; and providing the output to a second set of neuron populations of the neural network in response to determining the output is a false positive, wherein the output is unlearned as the output propagates through the second set of neuron populations.

10. The computer program product of claim 9, wherein self-tuning the neural network further comprises:
applying a first learning rule based on firing activity of the first set of neuron populations to adjust synaptic weights of a first set of pathways interconnecting the first set of neuron populations in response to determining the output is a false negative; and applying a second learning rule based on firing activity of the second set of neuron populations to adjust synaptic weights of a second set of pathways interconnecting the second set of neuron populations in response to determining the output is a false positive.

11. The computer program product of claim 10, wherein the first learning rule is a Hebb learning rule and the second learning rule is an anti-Hebb learning rule.

12. The computer program product of claim 10, wherein the first learning rule is a spike-timing dependent plasticity (STDP) learning rule and the second learning rule is an anti-STDP learning rule.

* * * * *